United States Patent
Imamura et al.

(10) Patent No.: US 6,453,369 B1
(45) Date of Patent: *Sep. 17, 2002

(54) ACCESS PROTECTION FROM UNAUTHORIZED USE OF MEMORY MEDIUM USING IDENTIFIER UNIQUE TO DATA STORAGE DEVICE

(75) Inventors: Kiyomi Imamura, Kawasaki; Teruji Yamakawa, Yokohama, both of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,537

(22) Filed: Oct. 13, 1998

(30) Foreign Application Priority Data

Jan. 20, 1998 (JP) .......................................... 10-008914
Feb. 20, 1998 (JP) .......................................... 10-038840

(51) Int. Cl.⁷ .................... G06F 12/14; G06F 12/00; G06F 13/00; G06F 3/00; G06F 3/06
(52) U.S. Cl. ............................ 710/36; 710/37; 710/62; 710/63; 710/64; 710/72; 710/73; 710/74; 710/200; 711/100; 711/111; 711/115; 711/152; 711/163; 711/164; 713/200; 713/202
(58) Field of Search ............................ 710/13, 1, 3, 23, 710/28, 36, 37, 62–64, 72–74, 200; 711/100, 111, 115, 152, 163, 164; 713/200, 202; 380/4

(56) References Cited

U.S. PATENT DOCUMENTS

| 5,282,247 A | * | 1/1994 | McLean et al. .................. 380/4 |
| 5,311,498 A | * | 5/1994 | Horiguchi ................. 369/275.1 |
| 5,371,792 A | * | 12/1994 | Asai et al. ...................... 380/3 |
| 5,379,433 A | | 1/1995 | Yamagishi ................... 395/725 |
| 5,400,319 A | * | 3/1995 | Fite et al. ................. 369/275.5 |

(List continued on next page.)

FOREIGN PATENT DOCUMENTS

| EP | 439290 | 7/1991 |
| EP | 553545 | 8/1993 |
| EP | 773490 | 5/1997 |
| EP | 813194 | 12/1997 |
| EP | 930615 | 7/1999 |
| JP | 1243150 | 9/1989 |
| JP | 6259938 | 9/1994 |
| JP | 855022 | 2/1996 |
| JP | 9134311 | 5/1997 |
| JP | 9134330 | 5/1997 |
| JP | 9198778 | 7/1997 |
| WO | 97/03398 | 1/1997 |

*Primary Examiner*—Jeffrey Gaffin
*Assistant Examiner*—Ianh Q. Nguyen
(74) *Attorney, Agent, or Firm*—Greer, Burns & Crain, Ltd.

(57) ABSTRACT

A data storage device reads data from and/or writes data to a memory medium. The data storage device includes a storage unit for storing a first identifier, an identifier acquisition unit for acquiring a second identifier recorded on a memory medium which is set to the data storage device, and a controller for comparing the first identifier with the second identifier, and then controlling to access to the memory medium for data reading and/or writing according to a relationship between the first identifier and the second identifier. For example, when the first identifier does not match the second identifier, the controller inhibits access to the memory medium for the reading of data. But, when the first and second identifiers match, the controller permits access to the memory medium for the reading and writing of data. Since the storage device having an identifier which differs from the identifier recorded on the memory medium inhibits access to the memory medium for the reading and writing of data, the secrecy of data recorded on the memory medium is ensured.

19 Claims, 28 Drawing Sheets

U.S. PATENT DOCUMENTS

| | | | | |
|---|---|---|---|---|
| 5,599,231 A | * | 2/1997 | Hibino et al. | 463/29 |
| 5,644,444 A | | 7/1997 | Braithwaite et al. | 360/60 |
| 5,805,800 A | * | 9/1998 | Kotani et al. | 713/200 |
| 5,857,021 A | * | 1/1999 | Kataoka et al. | 380/4 |
| 5,940,854 A | * | 8/1999 | Green, Jr. et al. | 711/112 |
| 5,996,028 A | * | 11/1999 | Niimi et al. | 710/13 |
| 6,012,143 A | * | 1/2000 | Tanaka | 713/200 |
| 6,092,195 A | * | 7/2000 | Nguyen | 713/200 |
| 6,104,561 A | * | 8/2000 | Braithwaite et al. | 360/60 |
| 6,122,739 A | * | 9/2000 | Kutaragi et al. | 713/200 |
| 6,198,708 B1 | * | 3/2001 | Suzuki | 369/54 |
| 6,243,796 B1 | * | 6/2001 | Otsuka | 711/163 |

* cited by examiner

FIG. 2

| | Zone | Radius mm | Track No. |
|---|---|---|---|
| Medium information management area | Lead-in Zone | | |
| |    Initial Zone | 22.60~23.14 | |
| | Acquire Zone | | |
| |    Lead-in tracks | 23.14~23.60 | -434~-93 |
| |    Focus tracks | 23.60~23.61 | -88~-85 |
| | Inner Test Zone | | |
| |    for manufacturers | 23.61~23.65 | -84~-53 |
| |    for drives | 23.65~23.70 | -52~-21 |
| | Inner Control Zone | 23.70~23.72 | -20~-5 |
| | Buffer Zone | 23.72~23.72 | -4~-1 |
| Data area | Data Zone | 23.72~41.00 | 0~18479 |
| Medium information management area | Outer Test Zone | | |
| |    for manufacturers | 41.00~41.02 | 18480~18511 |
| |    for drives | 41.02~41.06 | 18512~18543 |
| | Buffer Zone | 41.06~41.28 | 18544~18854 |

FIG. 3

| Byte | Bit | | | | | | | |
|---|---|---|---|---|---|---|---|---|
| | | 7 | 6 | 5 | 4 | 3 | 2 | 1 | 0 |
| 00 | 0 | 0 | 0 | 0 | 0 | 1 | 0 | 0 |
| 01 | LUN | | | FMT DATA | CMP LIST | DEFECT LIST FORMAT | | |
| 02 | Security level | | | | | | | |
| 03 | INTERLEAVE | | | | | | | |
| 04 | INTERLEAVE | | | | | | | |
| 05 | 0 | 0 | 0 | 0 | 0 | 0 | Flag | Link |

FIG. 4

| | | \multicolumn{8}{c}{Bit} | | | | | | | |
|---|---|---|---|---|---|---|---|---|---|
| | | 7 | 6 | 5 | 4 | 3 | 2 | 1 | 0 |
| Byte | 00 | 1 | 1 | 1 | 0 | 0 | 0 | 0 | 0 |
| | 01 | \multicolumn{3}{c\|}{LUN} | 0 | 0 | 0 | 0 | 0 |
| | 02 | \multicolumn{8}{c\|}{Security level} | | | | | | | |
| | 03 | \multicolumn{8}{c\|}{X'00'} | | | | | | | |
| | 04 | \multicolumn{8}{c\|}{Parameter list length} | | | | | | | |
| | 05 | 0 | 0 | 0 | 0 | 0 | 0 | Flag | Link |

FIG. 6A

| Bit<br>Byte | 7 | 6 | 5 | 4 | 3 | 2 | 1 | 0 |
|---|---|---|---|---|---|---|---|---|
| 0 | X' 00' ||||||||
| 1 | X' 00' ||||||||
| 2 | X' 00' |||||  Write address information | Read address information | LBASET |
| 3 | Data block length ||||||||

FIG. 6B

| Bit<br>Byte | 7 | 6 | 5 | 4 | 3 | 2 | 1 | 0 |
|---|---|---|---|---|---|---|---|---|
| 0 | Security level ||||||||
| 1 | Page code ||||||||
| ⋮<br>n | Parameter field ||||||||

FIG. 7A

| Bit<br>Byte | 7 | 6 | 5 | 4 | 3 | 2 | 1 | 0 |
|---|---|---|---|---|---|---|---|---|
| 0 | \multicolumn{8}{c}{X' 01'} ||||||||
| 1 | X' 01' |||||||||
| 2~22 | Password |||||||||

FIG. 7B

| Bit<br>Byte | 7 | 6 | 5 | 4 | 3 | 2 | 1 | 0 |
|---|---|---|---|---|---|---|---|---|
| 0 | X' 01' |||||||||
| 1 | X' 02' |||||||||
| 2 | Page length |||||||||
| 3~6 | Security LBA |||||||||
| ⋮ | Security LBA |||||||||
| n~n+3 | Security LBA |||||||||

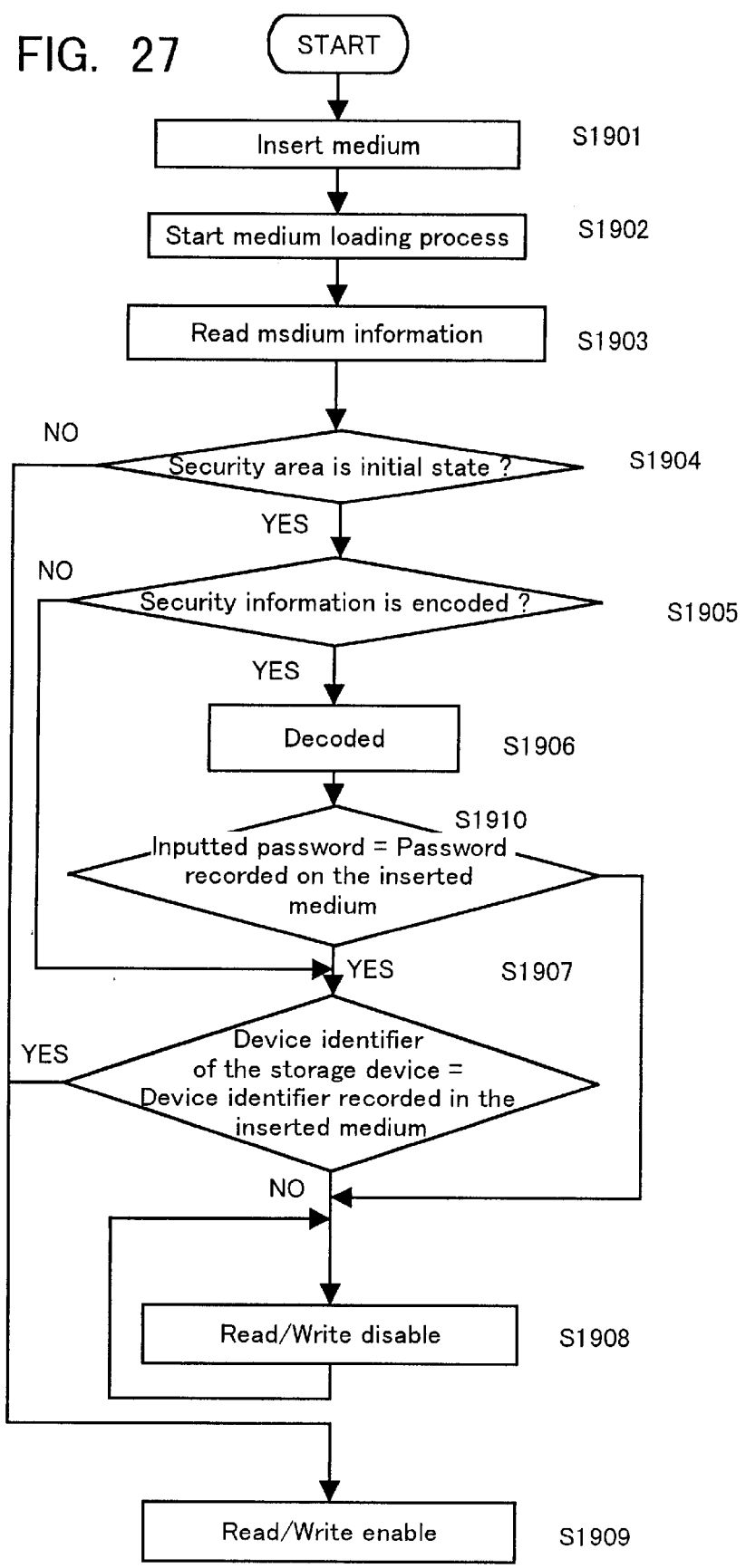

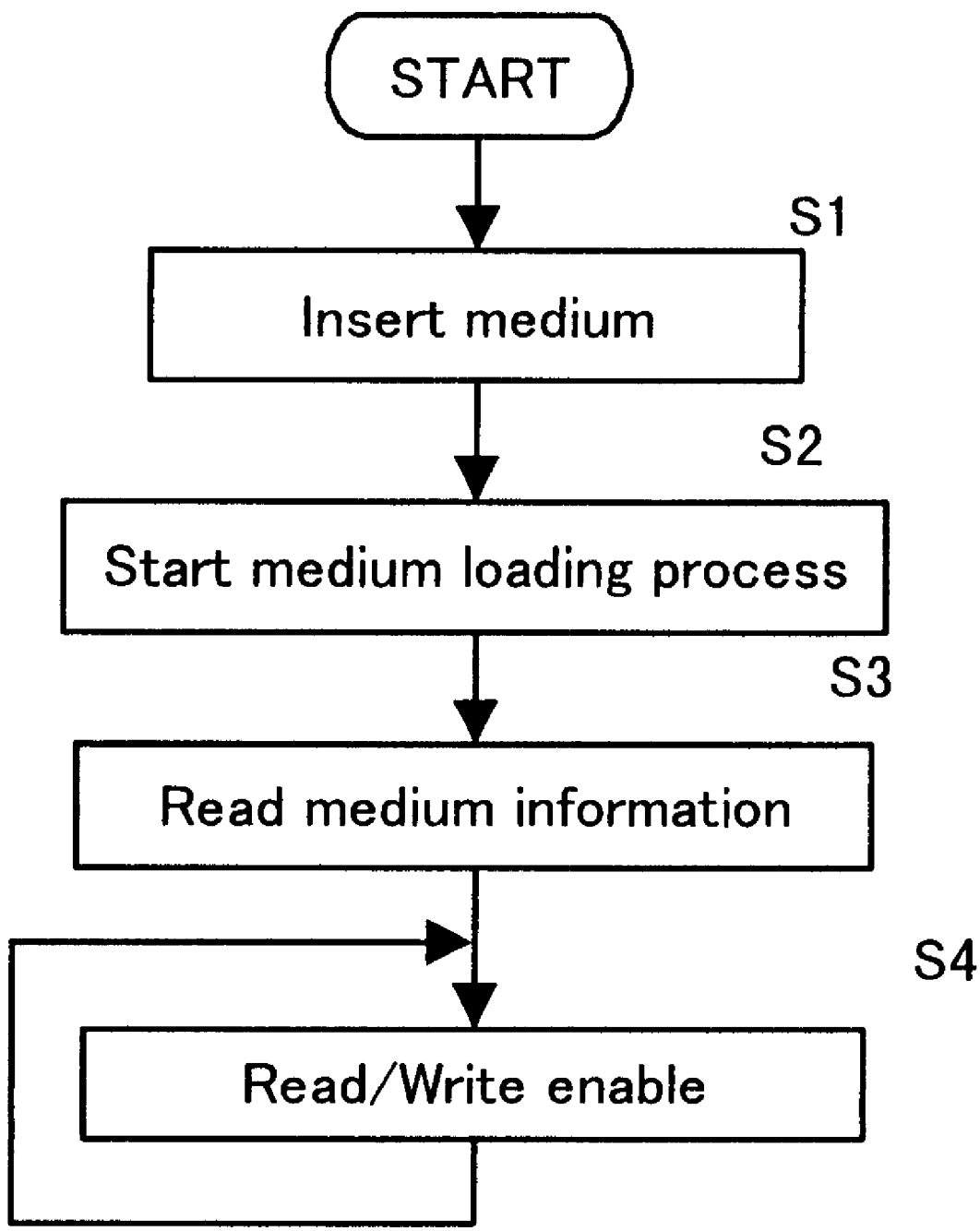

ACCESS PROTECTION FROM UNAUTHORIZED USE OF MEMORY MEDIUM USING IDENTIFIER UNIQUE TO DATA STORAGE DEVICE

BACKGROUND OF THE INVENTION

1. Field of the Invention

The present invention relates to a data storage device for recording data on a memory medium, such as a magneto-optical disk, and in particular to a data storage device which ensures the secrecy and the security of recorded data.

2. Related Arts

Generally, a data writable memory medium, such as a magneto-optical disk (MO), can be inserted into or removed from a data storage device (hereinafter simply referred to as a storage device) which reads and writes predetermined data from and to. When a memory medium is loaded into the storage device, operational control for the storage device is provided by commands issued by a superior apparatus, such as a personal computer connected to the storage device by a SCSI cable.

Conventionally, by taking compatibility into account, reading data from and writing data to a memory medium can also be performed by a storage device other than the device which was originally employed for writing data.

FIG. 28 is a flowchart for a data reading/writing process performed by a conventional storage device. After a memory medium is set to (for example, inserted into) the storage device at step S1, at step S2 the medium is loaded. That is, the memory medium is positioned at a predetermined location within the storage device and is rotated at a controlled revolution rate. At step S3, predetermined data relevant to the memory medium, such as its configuration and its memory capacity, are read, and at step S4 the reading and writing of data is enabled by the employment of an operation or a process procedure based on data corresponding to that for the memory medium.

Therefore, a problem has arisen in that once a memory medium has been acquired, secret data recorded on the memory medium, such as the contents of a client database or design data, can easily be stolen or altered.

SUMMARY OF THE INVENTION

It is, therefore, one objective of the present invention to provide a data storage device that ensures the secrecy and the security of data recorded on a memory medium.

To achieve the above objective, according to the present invention, it is provided a data storage device which reads data from and/or writes data to a memory medium, comprises:

a storage unit for storing a first identifier;

an identifier acquisition unit for acquiring a second identifier recorded on a memory medium which is set to said data storage device; and a controller for comparing said first identifier with said second identifier, and controlling to access to said memory medium for data reading and/or writing according to a relationship between said first identifier and said second identifier.

For example, when the first identifier recorded in the storage unit does not match the second identifier recorded on the memory medium, the controller inhibits access to the memory medium for the reading and writing of data. But when the first and the second identifiers match, the controller permits access to the memory medium for the reading and writing of data.

As described above, since the storage device having an identifier which differs from the identifier recorded on the memory medium inhibits access to the memory medium for the reading and writing of data, the secrecy of data recorded on the memory medium is ensured.

Read address information to be used to control reading of data and/or write address information to be used to control writing of data are stored in a predetermined area on the memory medium. When the first identifier matches the second identifier, the controller may permit or inhibit the reading and/or writing of data according to the read address information and/or the write address information respectively.

In addition, to achieve the above objective, according to the present invention, it is provided a data storage device which reads data from and/or writes data to a memory medium by designating first address information, comprises:

a storage unit for storing a first identifier;

an identifier acquisition unit for acquiring a second identifier recorded in a memory medium which is set to said data storage device;

an address information acquisition unit for acquiring second address information recorded in said memory medium; and a controller for comparing said first identifier with said second identifier and said first address information with said second address information, and controlling to access to said memory medium for data reading and/or writing according to a relationship between said first identifier and said second identifier and a relationship between said first address information and said second address information.

The first identifier and the second identifier are identifiers inherent to a data storage device or identifiers inherent to a memory medium. For example, the identifier inherent to a data storage device or memory medium is a serial number of a data storage device or a memory medium.

Thus, Security can be established for each of a plurality of data items recorded on a memory medium.

Read address information to be used to control reading of data and/or write address information to be used to control writing of data are stored in a predetermined area on the memory medium. When the first identifier matches the second identifier and the second address information is included in the first address information, the controller may permit or inhibit the reading and/or writing of data according to the read address information and/or the write address information respectively.

In this structured data storage device, the controller records the second identifier, the read address information, the write address information, or the second address information in the predetermined area based on a predetermined setup command which is transmitted by a control device of a data storage device connected to the data storage device.

A predetermined setup command is, for example, a SCSI interface format command or a vender unique command.

Further, it is preferable that the controller can initialize a predetermined area based on a predetermined release command, which is transmitted from the control device of a data storage device connected to the data storage device.

Other features and advantages of the present invention will become readily apparent from the following description when taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 2 is a diagram showing an example layout for a format for a magneto-optical disk;

FIG. 3 is a diagram showing the structure of a CDB for a security setup command that employs a vendor unique command;

FIG. 4 is a diagram showing the structure of a CDB for a format command the security level of which is designated;

FIGS. 6A and 6B are diagrams depicting the structures of a parameter header and a level descriptor;

FIGS. 7A and 7B are diagrams in each of which is shown the structure of a parameter field for a level descriptor;

FIG. 27 is a flowchart for the memory medium loading process performed when security information is encoded and a password is set in the another embodiment; and FIG. 28 is a flowchart showing the conventional process performed when accessing a memory medium in the another embodiment.

DETAILED DESCRIPTION OF THE PREFERRED EMBODIMENTS

Figure 1:
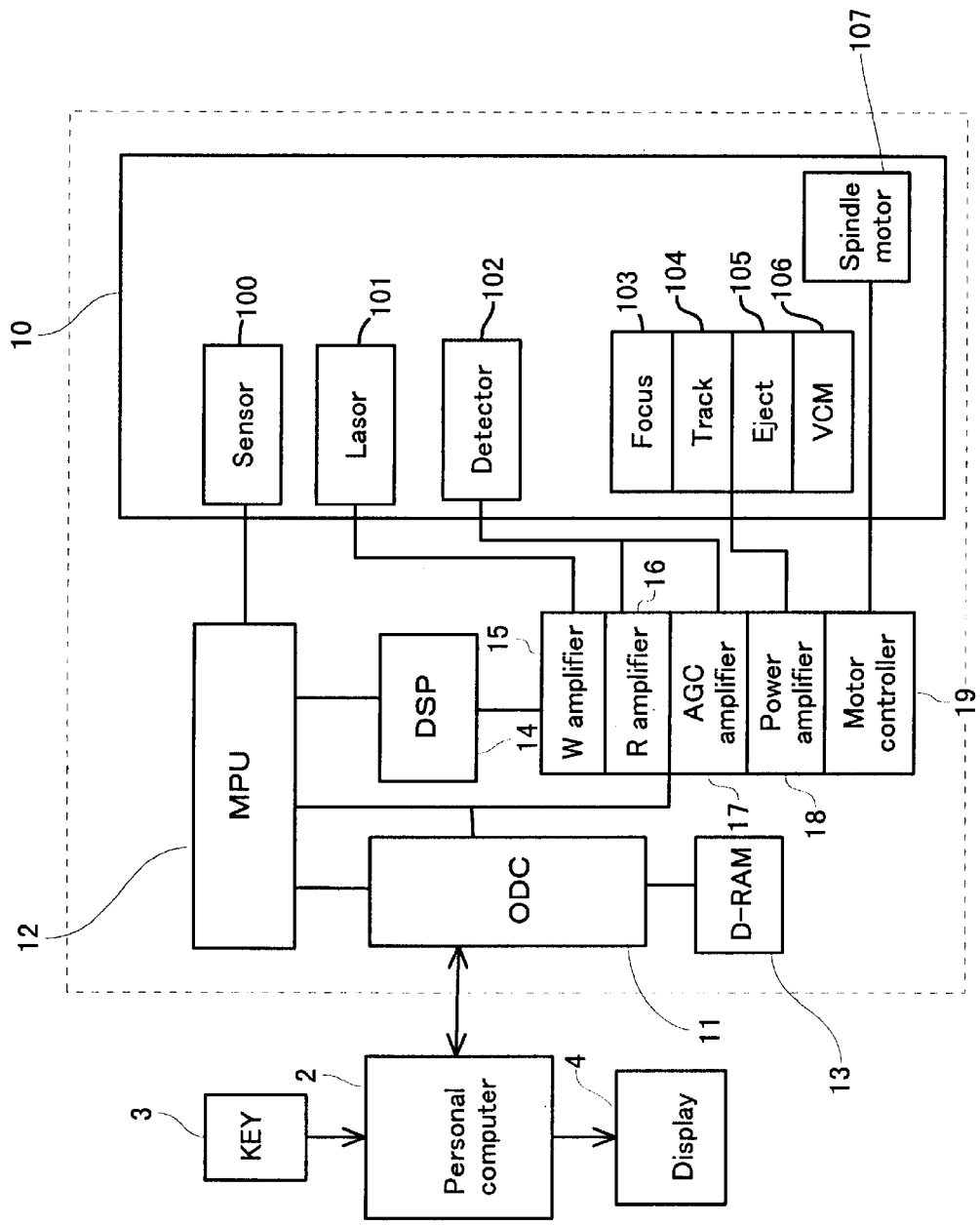
FIG. 1 is a block diagram illustrating a data storage device according to embodiments of the present invention.

The preferred embodiments of the present invention will now be described while referring to the accompanying drawings. However, the technical scope of the present invention is not limited to these embodiments. The same reference numerals or device identifiers are used to denote corresponding or identical components in the drawings.

In the embodiment of the present invention, a magneto-optical disk (MO) is employed as a memory medium (hereinafter referred to as a medium) for recording data, but the medium that can be employed is not thereby limited, and another exchangeable memory disk, such as a magnetic disk, a floppy disk, an optical disk or a phase change optical disk may be employed.

FIG. 1 is a schematic block diagram illustrating a magneto-optical disk device according to the present invention. In FIG. 1, a magneto-optical disk device 1 is connected via a SCSI interface to a personal computer 2, which is a superior apparatus.

The magneto-optical disk device 1 comprises a mechanism controller 10, for performing writing data to and reading data from a magneto-optical disk, and a control unit which includes a magneto-optical disk controller (ODC) which employs firmware to implement a method according to the present invention.

The control unit further includes an MPU 12, which controls the entire magneto-optical disk device 1; a D-RAM 13, which is a read/write buffer memory; a DSP 14, for performing positioning; a write data amplifier 14; a read data amplifier 16; an AGC amplifier 17; a head drive power amplifier 18; and a disk rotation motor controller 19.

The mechanism controller 10 includes a head sensor 100, a data reading/writing laser diode 101, and a detector 102 for detecting the inclination of a head. Further, the mechanism controller 10 includes a focus actuator 103, which is controlled by the head drive power amplifier 18; a track actuator 104; a disk ejection motor 105; a head drive voice coil motor 106; and a spindle motor 107, which is controlled by the motor controller 19 for rotating a disk.

When an operator enters an instruction at a keyboard 3 of the personal computer 2, a SCSI command is transmitted by the computer 2 to the magneto-optical disk controller (ODC) 11 to initiate the writing/reading of data. Connected to the computer 2 is a display 4 on which data are displayed.

The magneto-optical disk controller (ODC) 11, which is provided with flash ROM for the storage of firmware, has an analysis function for analyzing SCSI commands received from the computer 2, and a coordination function for interacting with the MPU 12, in response to a SCSI command, to provide data writing/reading control of the mechanism controller 10.

The present invention can be applied not only for a SCSI command system but also for another command system, such as an ATA/ATAPI/SASI command system.

FIG. 2 is a diagram showing an example layout of a disk format for a magneto-optical disk (MO), i.e., the arrangement of areas on a medium as specified by the ISO standards established for 3.5 inch magneto-optical disk cartridges. As is shown in FIG. 2, in a range extending from a radius of 23.72 mm from the center of the MO disk to a radius of 41.00 mm is a data area in which user data can be recorded. The inside and the outside areas in the radial direction are medium information management areas in which are stored various medium information, such as the type and the structure of a medium.

In the preferred embodiments of the present invention, an additional security area is provided in the medium information management area, and recorded as security information in the security area is a device identifier inherent to a magneto-optical disk device (hereinafter referred to as a storage device), such as a serial number. Or alternately, areas for manufacturers in an inner test zone and an outer test zone or a buffer zone in FIG. 2 may be employed as security areas.

When a magneto-optical disk in which the device identifier is recorded is inserted into a specific storage device, data reading/writing control is provided in accordance with the relationship between the device identifier of the storage device and the device identifier recorded in the medium. For example, only when the two identifiers match, the reading/writing of data is permitted. In other words, since a storage device whose device identifier differs from that recorded in a medium inhibits the reading/writing of data from/to the medium, the secrecy of data can be maintained.

The writing in a medium of the device identifier is performed by the magneto-optical disk controller (ODC) 11 of a storage device in accordance with a security setup command received from a superior apparatus. FIG. 3 is a diagram showing an example CDB (Command Descriptor Block) for a security setup command which is transmitted from the personal computer 2 to the storage device 1. The security setup command in FIG. 3 is prepared by using a vender unique command for the SCSI interface. As is described above, the security setup data, according to which medium access is permitted only when the device identifier recorded in a medium matches the device identifier of a storage device, are set to the security level of the security setup command.

The security level may be designated in accordance with a normal format command, instead of the security setup command being set by using the vender unique command. FIG. 4 is a diagram showing an example CDB for a format command for which the security level is set by using the SCSI command.

Figure 5:
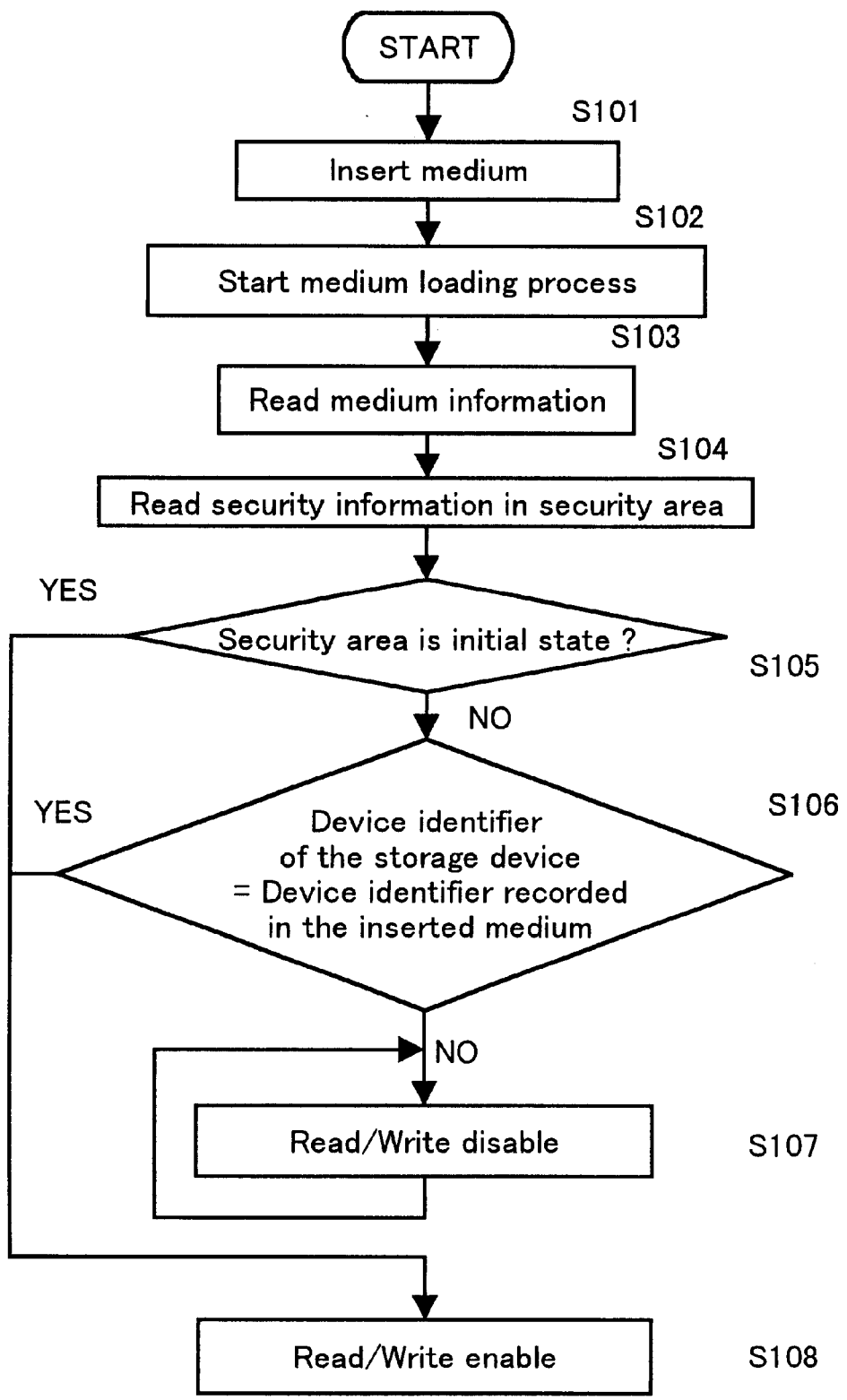
FIG. 5 is a flowchart for security process performed according to a first embodiment of the present invention.

When the magneto-optical disk controller (ODC) 11 of the storage device 1 receives a security setup command or a format command, the security level of which has been set, the disk controller 11 writes(records) the device identifier of the storage device in a pre-designated security area on the loaded medium. As a result, the security information is recorded in the medium. The device identifier of the storage device is stored in the flash ROM provided for the magneto-optical disk controller (ODC) FIG. 5 is a flowchart for the security process, performed by the above described storage device 1, according to a first embodiment of the present invention. The security process, which will be explained below, is performed by the magneto-optical disk controller (ODC) 11 of the storage device 1.

In FIG. 5, when a medium is set to (for example, inserted into) the storage device 1 at step S101, the medium is loaded at step S102. That is, the medium is positioned at a predetermined location within the storage device 1, and is rotated at a specific rotation rate. At step S103, data in the medium information management area on the medium are read, and at step S104, the security information (device identifier) recorded in the security area are read.

At step S105, a check is performed to determine whether the security area is in the initial state. When the security area is in the initial state, i.e., when no device identifier has been recorded in the security area, the process then advances to step S108, whereat the reading of data from the medium and the writing of data to it are permitted. It is assumed that the security level has not yet been set.

If, at step S105, the device identifier has been recorded in the security area, i.e., if the security level has been set, at step S106, the device identifier recorded on the medium is compared with the device identifier of the storage device 1 in which the medium is currently loaded in order to determine whether the two device identifiers match.

When the two device identifiers match, the process then advances to step S108, whereat the security is released and the reading of data from the medium and the writing of data to it are permitted.

When at step S106, the two device identifiers do not match, the security is not released and the reading/writing of data is inhibited (step S107).

As described above, in this embodiment, the security area in which the device identifier of a storage device is recorded is provided for the medium information management area. When the medium is loaded into the storage device and when the device identifier of the storage device does not match the device identifier recorded in the medium, the reading and writing of data is inhibited. Thus, even though the medium has been stolen, the secrecy of the data recorded in the medium can be maintained.

To enhance the security, it is preferable that a further security function is prepared in addition to the above security information.

Thus, read address information and write address information are recorded in the parameter head of a parameter, which is designated by the security setup command (FIG. 3) or the format command (FIG. 4) for which the security level has been set. FIGS. 6A and 6B are diagrams showing an example structure for a parameter designated by the above command. The parameter is constituted by a parameter head shown in FIG. 6A and a level descriptor shown in FIG. 6B. The read and write address information is recorded in the parameter head in FIG. 6A. The level descriptor in FIG. 6B consists of a header of two bytes and a succeeding parameter field. The parameter field is divided into units called pages, for individual function attributes.

If, for example, the read address information has been designated, the reading of data is inhibited even when the device identifiers match. If the read address information has not been set, the reading of data is permitted.

If the write address information has been designated, the writing of data can be inhibited even when the device identifiers match. If the write address information has not been set, the writing of data is permitted. The read address information and the write address information are recorded in the security area at the same time when the device identifier of the storage device is recorded in the security area.

When the read address information or the write address information has been set, the reading or writing of data is inhibited, which is inconvenient. Therefore, preferably, if the read address information or the write address information has been set, a predetermined password is also set, so that when a password is input, the reading or writing of data can be enabled even though the address information has been set. In addition, when a predetermined password has been set, regardless of whether the read or write address information has been set, and when reading and writing are permitted if the both of the device identifiers and the passwords match, a double level of security can be established and the secrecy of data can be enhanced.

The password is recorded in the level descriptor in the parameter. FIG. 7A is a diagram showing a page for a password in the parameter field (see FIG. 6B) of the level descriptor. When the security is set up, the password is recorded to the security area of the medium together with the address information. FIG. 7B is a diagram showing pages, in the parameter field of the level descriptor, designated for a logical block address (LBA), which will be described later.

Figure 8:
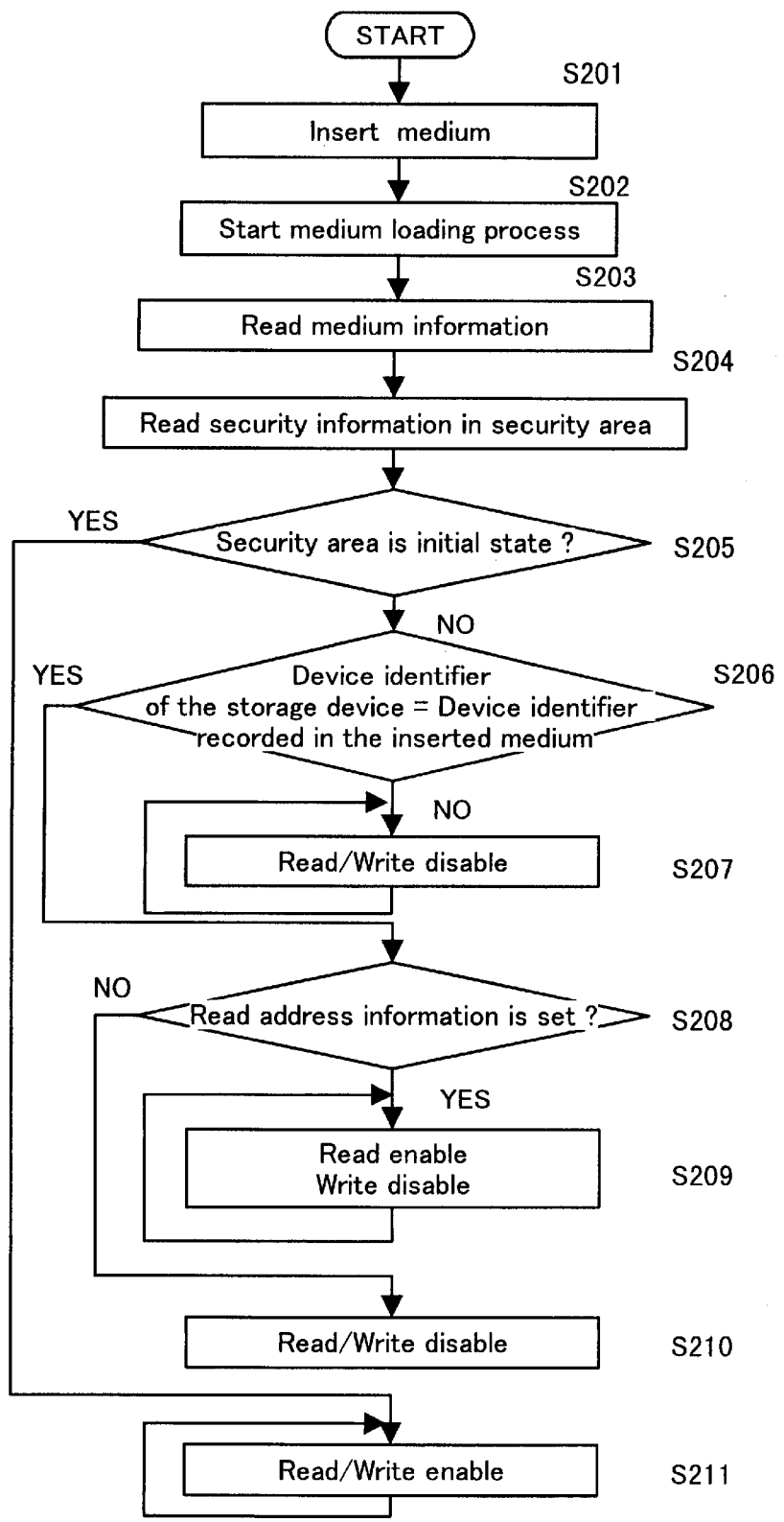
FIG. 8 is a flowchart for the security process performed according to a second embodiment of the present invention.

FIG. 8 is a flowchart for the security process performed according to a second embodiment of the present invention. In the second embodiment, the read address information is recorded in the above described parameter head. Since steps S201 to S205 in FIG. 8 correspond to steps S101 to S105 in FIG. 5, no explanation for them will be given.

When, at step S205, the security area is in the initial state, it is assumed that the security information has not yet been set, and the process advances to step S211, whereat the reading of data from the medium and writing of data to the medium are permitted. If, at step S205, the security information has been set, at step S206, the device identifier recorded on the medium is compared with the device identifier of a storage device into which the medium has currently been loaded to determine whether the two device identifiers match. When the device identifiers do not match, the security is not released, and the reading and writing of data are inhibited (step S207).

When the two device identifiers match, the process advances to step S208, whereat a check is performed to determine whether reading in accordance with the read address information is permitted. When read address information has been set, the process advances to step S209, whereat the reading of data is enabled but the writing of data is inhibited. That is, even though data stored on the medium can be read and the contents can be examined, the writing of data, such as the altering of data, is not enabled. When the read address information has not been set, the process advances to step S210, whereat both the reading and the writing of data are inhibited.

Figure 9:
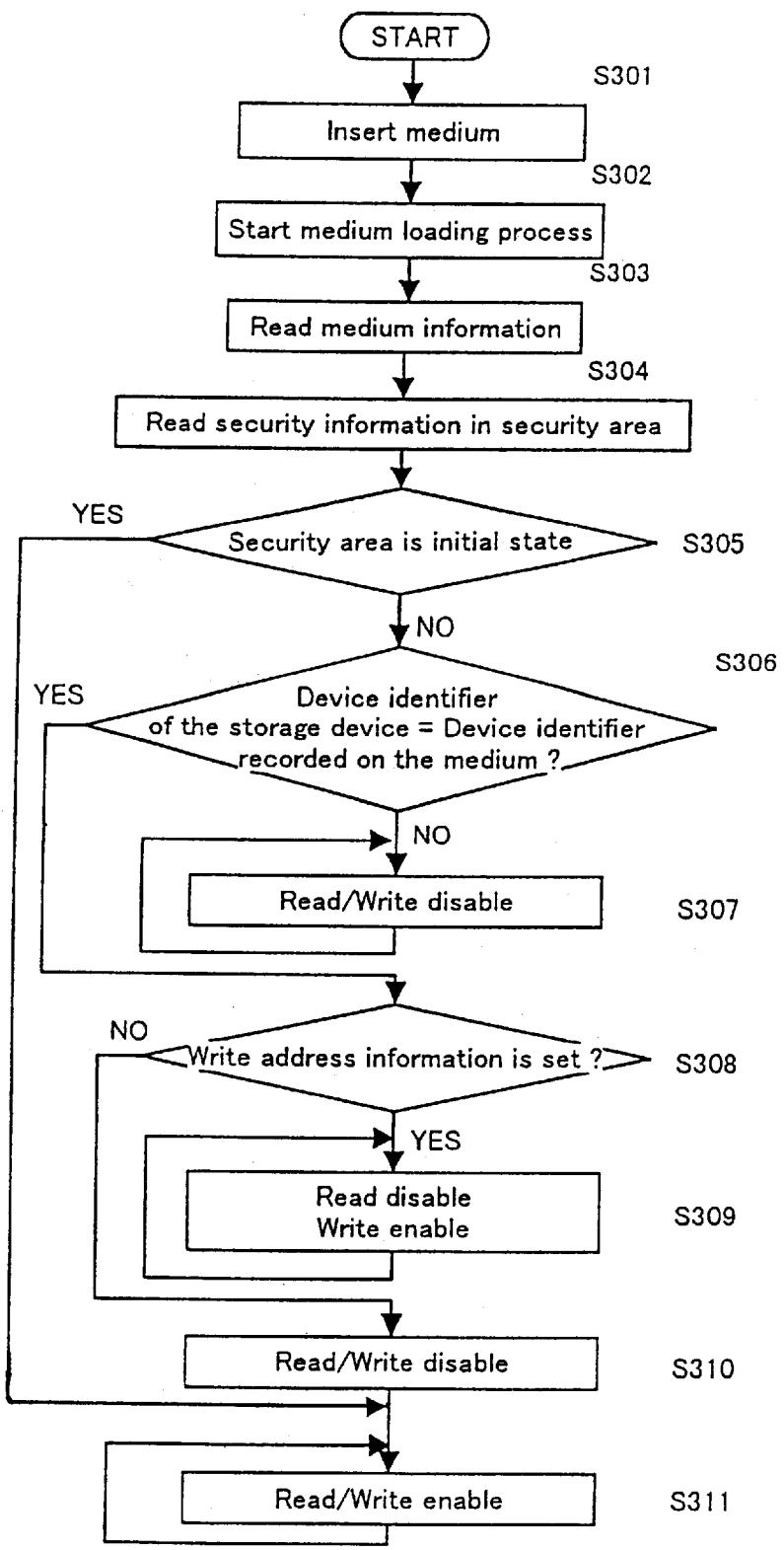
FIG. 9 is a flowchart for the security process performed according to a third embodiment of the present invention.

FIG. 9 is a flowchart showing the security process performed according to a third embodiment of the present invention. In this embodiment, the write address information is set in the parameter header. Since steps S301 to S305 in FIG. 9 correspond to steps S101 to S105 in FIG. 5, no explanation for them will be given.

When, at step S305, the security area is in the initial state, it is assumed that the security information has not yet been set and the process advances to step S311, whereat the reading of data from the medium and the writing of data to the medium are permitted. If, at step S305, the security information has been set, at step S306, the device identifier recorded on the medium is compared with the device identifier of the storage device into which the medium has currently been loaded to determine whether the two device identifiers match. When the device identifiers do not match, the security are not released, and the reading and the writing of data are inhibited (step S307).

When the two device identifiers match, the process advances to step S308, whereat a check is performed to determine whether writing in accordance with the write address information is permitted. When the write address information has been set, the process advances to step S309, whereat the writing of data is permitted but the reading of data is inhibited. That is, even though new data can be created, the data stored on the medium can not be read.

When the write address information has not been set, the process advances to step S310, whereat both the reading and the writing of data are inhibited.

Figure 10:
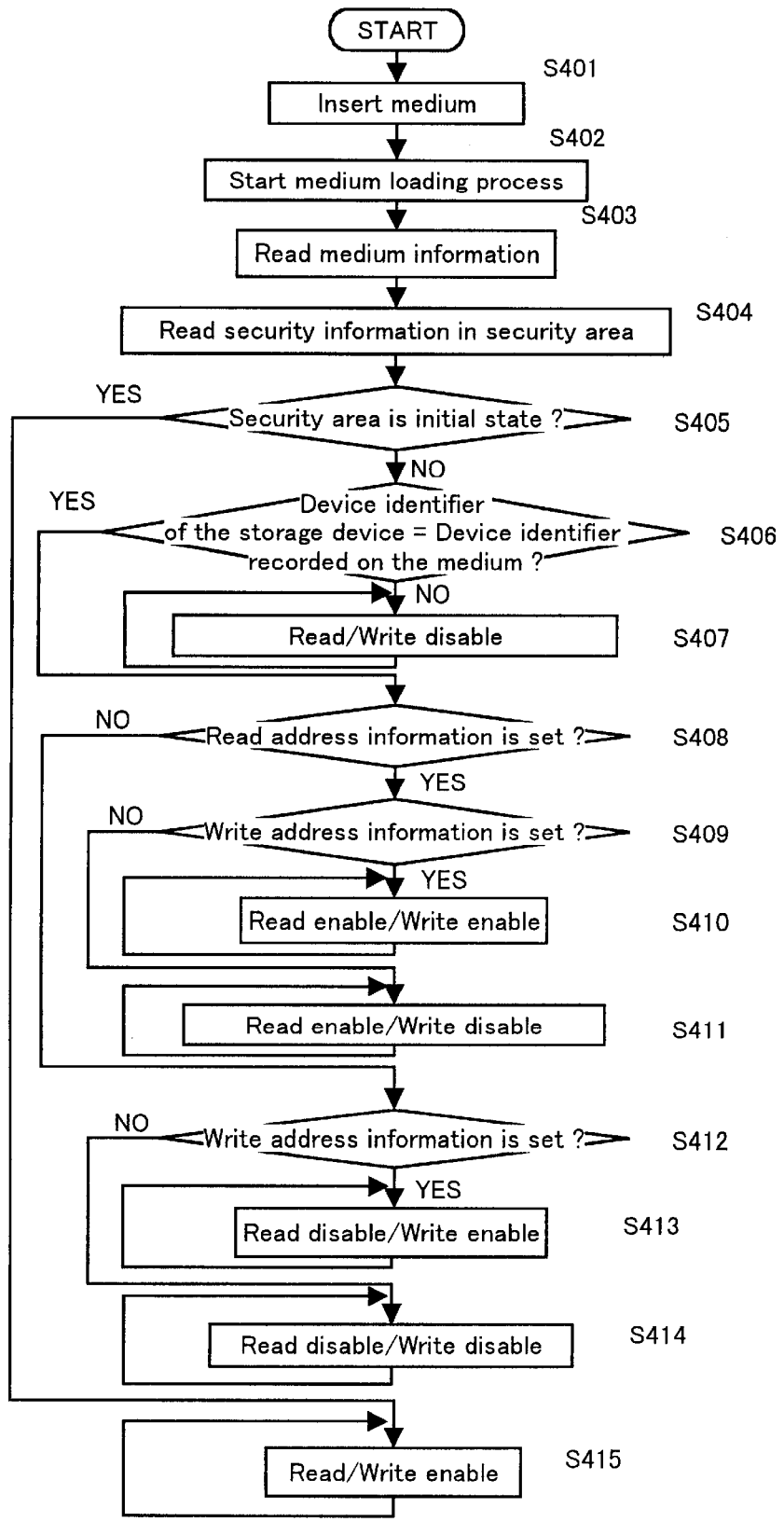
FIG. 10 is a flowchart for the security process performed according to a fourth embodiment of the present invention.

FIG. 10 is a flowchart showing the security process performed according to a fourth embodiment of the present invention. In this embodiment, both the read address information and the write address information are set in the parameter header. Since steps S401 to S405 in FIG. 10 correspond to steps S101 to S105 in FIG. 5, no explanation for them will be given.

When, at step S405, the security area is in the initial state, it is assumed that the security information has not yet been set, and the process advances to step S415, whereat the reading of data from the medium and writing of data to the medium are permitted. If, at step S405, the security information has been set, at step S406, the device identifier recorded on the medium is compared with the device identifier of the storage device into which the medium has currently been loaded to determine whether the two device identifiers match. When the device identifiers do not match, the security is not released, and the reading and the writing of data are inhibited (step S407).

When the two device identifiers match, the process advances to step S408, whereat a check is performed to determine whether reading in accordance with the read address information is permitted. When the read address information has been set, the process advances to step S409, whereat a check is performed to determine whether writing in accordance with the write address information is permitted. When the write address information has been set, at step S410 both the reading and the writing of data are enabled. If, at step S409, the write address information has not been set, at step S411, the reading of data is enabled and the writing of data is inhibited.

If, at step S408, the read address information has not been set, the process advances to step S412, whereat, as well as at step S409, a check is performed to determine whether writing in accordance with the write address information is permitted. When the write address information has been set, at step S413, the writing of data is permitted but the reading of data is inhibited. If, at step S412, the write address information has not been set, at step S414, both the reading and the writing of data are inhibited.

In above described embodiments, the security is set to all data stored in the medium is read. But it is preferable to set the security to a part of the data, because a part of the data needs to be set the security.

Therefore, when the security information is recorded to the medium, a logical block address (LBA) for data for which the security is to be set is designated to the level descriptor for the parameter in FIG. 6. More specifically, an LBA designation page to designate data for which the security is to be set is provided for the parameter field in the level descriptor (see FIG. 7B). As is shown in FIG. 7B, a single data LBA (security LBA) for setting the security is designated which has, for example, a length of three bytes. The data for the security LBA are recorded in the security area at the same time as the device identifier of the storage device is recorded in the security area.

Figure 11:
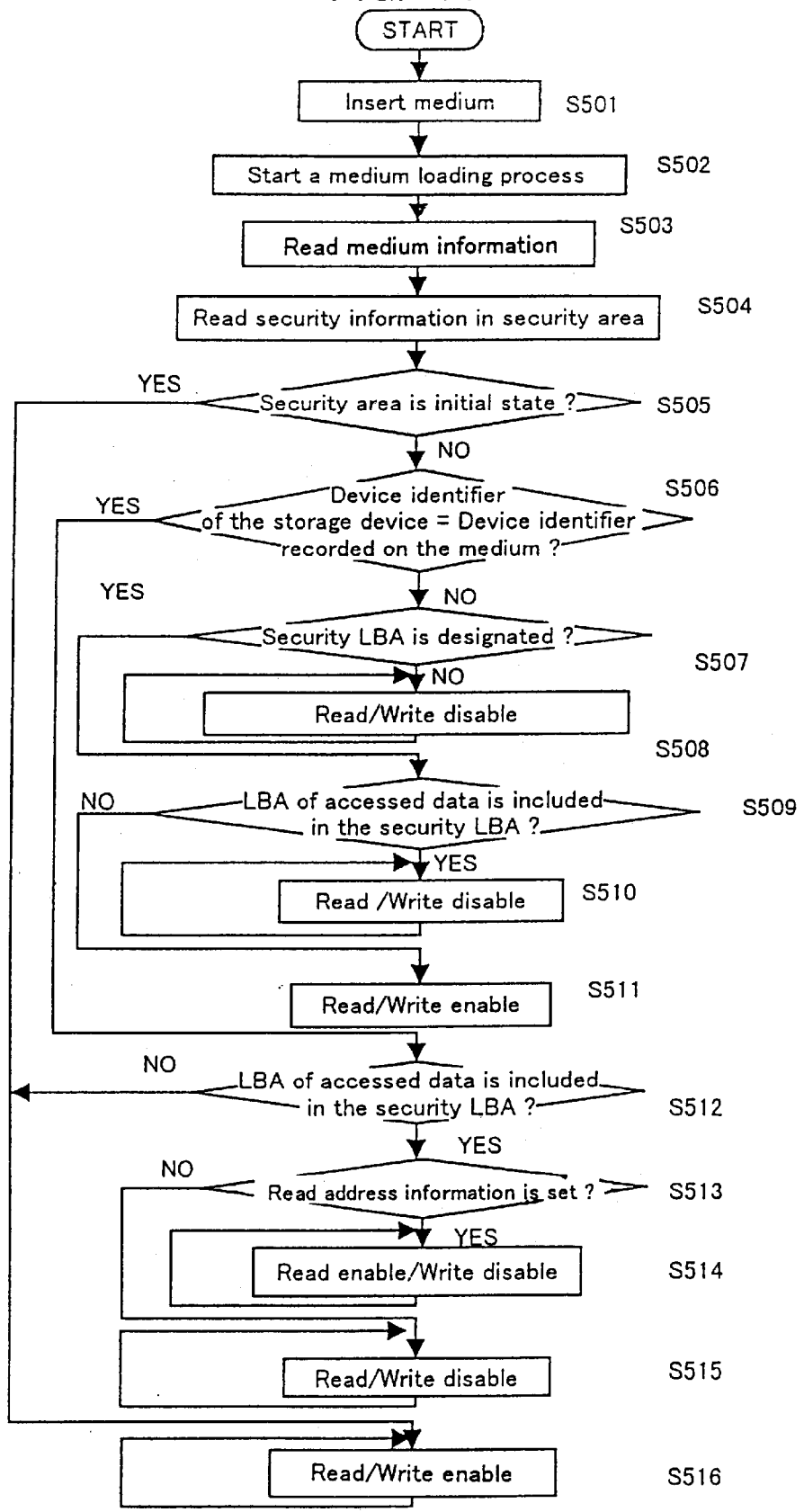
FIG. 11 is a flowchart for the security process performed according to a fifth embodiment of the present invention.

FIG. 11 is a flowchart for the security process performed according to a fifth embodiment of the present invention. In the fifth embodiment, as well as in the second embodiment, the security LBA is set when the read address information is set. Since steps S501 to S505 in FIG. 11 correspond to steps S101 to S105 in FIG. 5, no explanation for them will be given.

When, at step S505, the security area is in the initial state, it is assumed that the security information has not yet been set and the process advances to step S516, whereat the reading of data from the medium and the writing of data to the medium are permitted. If, at step S505, the security information has been set, at step S506, the device identifier recorded on the medium is compared with the device identifier of the storage device into which the medium has currently been loaded to determine whether the two device identifiers match. When the device identifiers do not match, at step S507, a check is performed to determine whether a security LBA has been designated in the security area. When a security LBA has not been designated, the reading and the writing of data are inhibited (step S508).

If, at step S507, a security LBA has been designated, at step S509, a check is performed to determine whether the LBA for the data that are being accessed has been included in the security LBA. If the LBA for the data has been included in the security LBA, the process advances to step S510, whereat the reading of data and the writing of data are inhibited.

If the LBA for the data has not been included, the process advances to step S511, whereat the reading of data and the writing of data are permitted.

When, at step S506, the two device identifiers match, at step S512, a check is performed to determine whether the LBA for the data that are being accessed has been included in the security LBA. If the LBA for the data has been included in the security LBA, the process advances to step S513, whereat a check is performed to determine whether reading in accordance with read address information is enabled.

When the read address information has been set, the process advances to step S514, whereat the reading of data is permitted but the writing of data is inhibited. That is, though data stored on the medium can be read and the contents can be examined, the writing of data, such as the altering of data, is not enabled. When the read address information has not been set, the process advances to step S515, whereat both the reading and the writing of data are inhibited.

If, at step S512, the LBA for the data that are being accessed has not been included in the security LBA, the process advances to step S516, whereat the reading of data and the writing of data are permitted.

Figure 12:
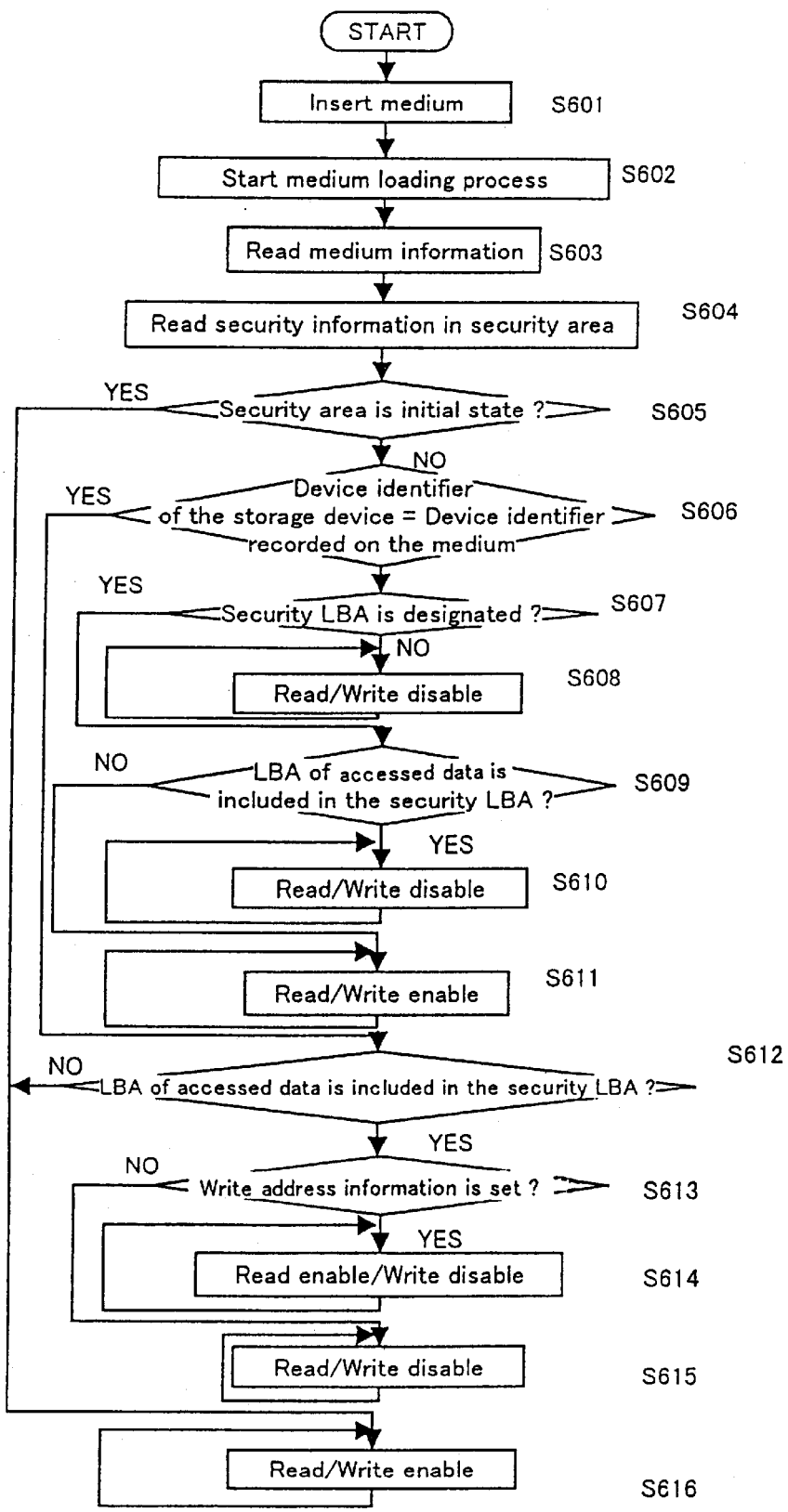
FIG. 12 is a flowchart for the security process performed according to a sixth embodiment of the present invention.

FIG. 12 is a flowchart for the security process performed according to a sixth embodiment of the present invention. In the sixth embodiment, as well as in the third embodiment, the security LBA is set when the write address information is set. Since steps S601 to S605 in FIG. 12 correspond to steps S101 to S105 in FIG. 5, no explanation for them will be given.

When, at step S605, the security area is in the initial state, it is assumed that the security information has not yet been set and the process advances to step S616, whereat the reading of data from the medium and the writing of data to the medium are permitted. If, at step S605, the security information has been set, at step S606, the device identifier recorded on the medium is compared with the device identifier of the storage device, into which the medium has currently been loaded to determine whether the two device identifiers match. When the device identifiers do not match, at step S607, a check is performed to determine whether the security LBA has been designated in the security area. When the security LBA has not been designated, the reading and the writing of data are inhibited (step S608).

If, at step S607, the security LBA has been designated, at step S609, a check is performed to determine whether the LBA for the data that are being accessed has been included in the security LBA. If the LBA for the data has been included in the security LBA, the process advances to step S610, whereat the reading of data and the writing of data are inhibited.

If the LBA for the data has not been included, the process advances to step S611, whereat the reading of data and the writing of data are permitted.

When, at step S606, the two device identifiers match, at step S612, a check is performed to determine whether the LBA for the data that are being accessed has been included in the security LBA. If the LBA for the data has been included in the security LBA, the process advances to step S613, whereat a check is performed to determine whether writing in accordance with the write address information is enabled.

When the write address information has been set, the process advances the step S614, whereat writing of data is permitted but the reading of data is inhibited. That is, though the creation of new data is permitted, the reading of data from the medium is inhibited. When the write address information has not been set, the process advances to step S615, whereat both the reading and the writing of data are inhibited.

If, at step S612, the LBA for the data that are being accessed has not been included in the security LBA, the process advances to step S616, whereat the reading of data and the writing of data are permitted.

Figure 13:
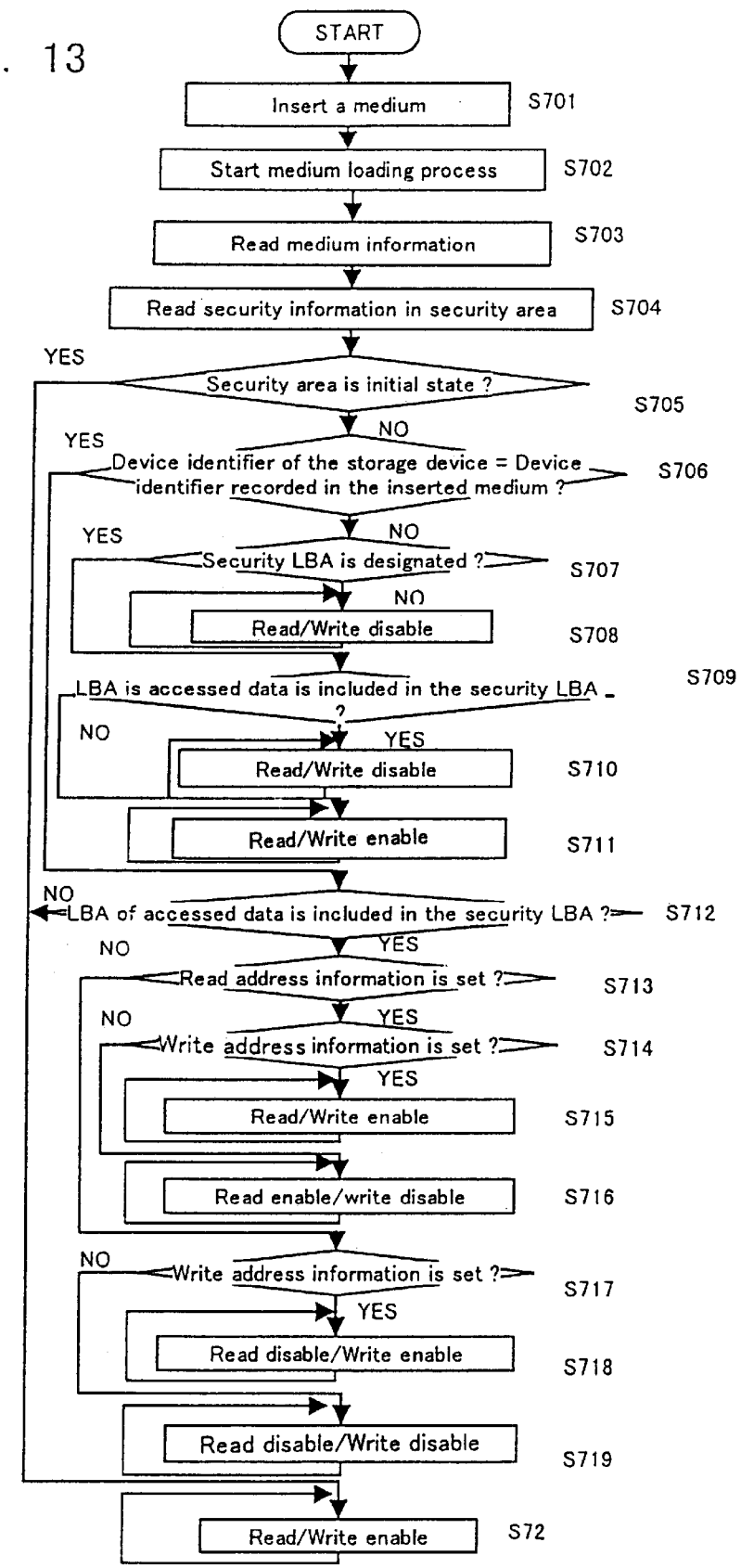
FIG. 13 is a flowchart for the security process performed according to a seventh embodiment of the present invention.

FIG. 13 is a flowchart for the security process performed according to a seventh embodiment of the present invention. In the seventh embodiment, as well as in the third embodiment, the security LBA is set when the read address information and the write address information are set. Since steps S701 to S705 in FIG. 13 correspond to steps S101 to S105 in FIG. 5, no explanation for them will be given.

When, at step S705, the security area is in the initial state, it is assumed that the security information has not yet been set and the process advances to step S720, whereat the reading of data from a medium and the writing of data to the medium are permitted. If, at step S705, the security information has been set, at step S706, the device identifier recorded on the medium is compared with the device identifier of the storage device into which the medium has currently been loaded in order to determine whether the two device identifiers match. When the device identifiers do not match, at step S707, a check is performed to determine whether the security LBA has been designated in the security area. When the security LBA has not been designated, the reading and the writing of data are inhibited (step S708).

If, at step S707, the security LBA has been designated, at step S709, a check is performed to determine whether the LBA for the data that are being accessed has been included in the security LBA. If the LBA for the data has been included in the security LBA, the process advances to step S710, whereat the reading of data and the writing of data are inhibited.

If the LBA for the data has not been included, the process advances to step S711, whereat the reading of data and the writing of data are permitted.

When, at step S706, the two device identifiers match, at step S712, a check is performed to determine whether the LBA for the data that are being accessed has been included in the security LBA. If the LBA for the data has been included in the security LBA, the process advances to step S713, whereat a check is performed to determine whether reading in accordance with the read address information is enabled. When the read address information has been set, the process advances to step S714, whereat a check is performed to determine whether writing in accordance with the write address information is enabled. When the write address information has been set, the process advances to step S715, whereat both the reading and the writing of data are permitted. When, at step S715, the write address information has not been set, at step S716 the reading of data is permitted but the writing of data is inhibited.

If, at step S713, the read address information has been set, the process advances to step S717, whereat a check is performed to determine whether writing in accordance with the write address information is enabled. When the write address information has been set, at step S718, the writing of data is permitted but the reading of data is inhibited. When, at step S717, the write address information has not been set, at step S719, both the reading and the writing of data are inhibited. If, at step S712, the LBA for the data that are being accessed has not been included in the security LBA, the process advances to step S720, whereat the reading of data and the writing of data are permitted.

Figure 14:
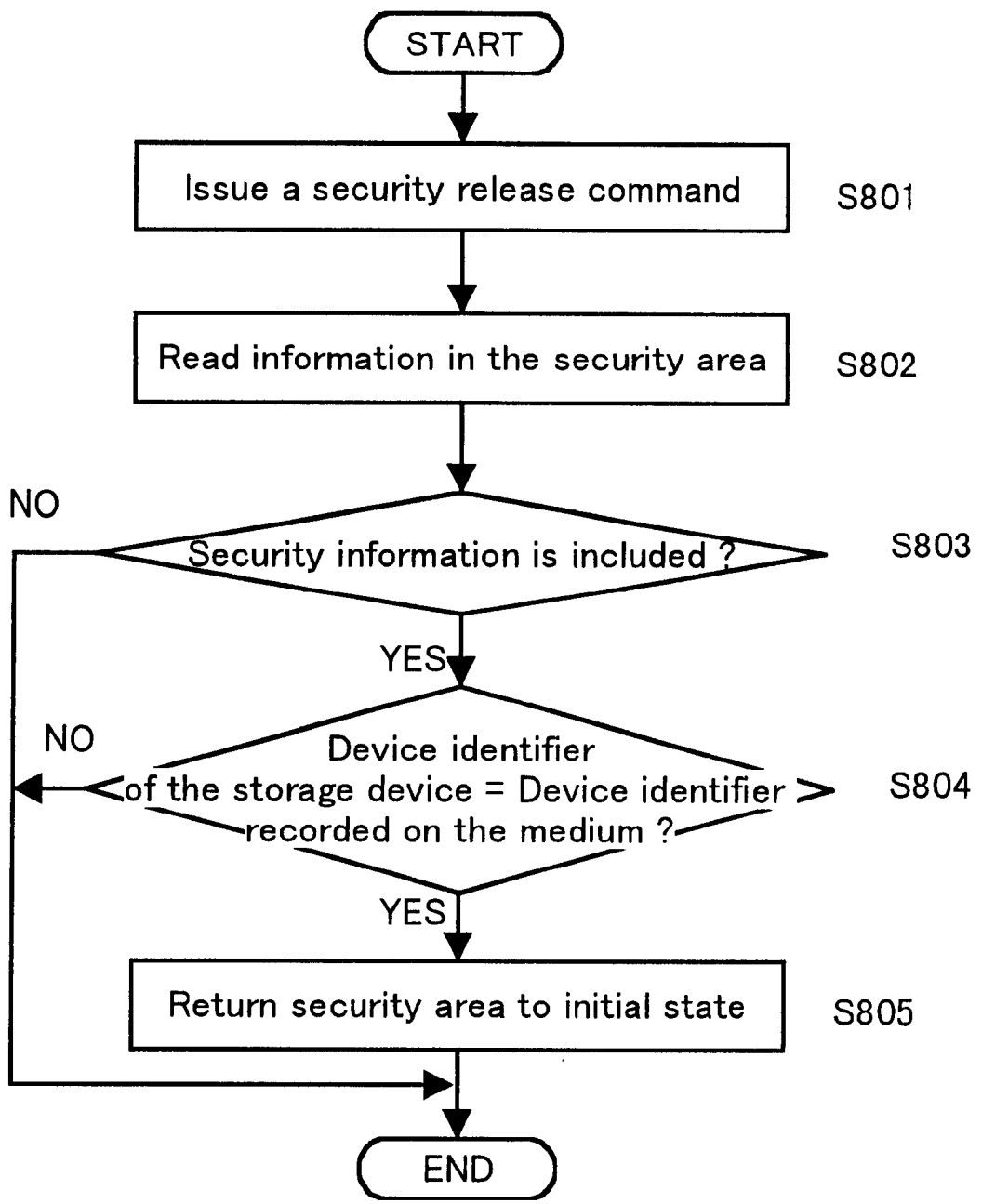
FIG. 14 is a flowchart for the security release process.

FIG. 14 is a flowchart for the security release process performed to release the security setup state in which the above described various security processes are performed.

First, at step S801 a security release command is transmitted from the computer 2 to the storage device 1. As well as the security setup command transmitted, the security release command is constituted by using the vender unique command at a SCSI interface.

At step S802, the address information in the security area are read, and at step S803 a check is performed to determine whether there are security information in the security area. When security information has been recorded in the security area, the process advances to step S804, whereat the device identifier included in the security area is compared with the device identifier of the storage device into which the medium has been loaded. When the two device identifiers match, a predetermined initial value is recorded in the security area to return the area to the initial state (to initialize the area) (step S805).

When the device identifiers do not match, or when no security information is recorded in the security area, the security release process is not performed.

Although not shown in the above flowchart, when the security information include a password, a step of inputting the password is provided, and only when the password included in the security information matches the password which was entered the release of security may be performed.

In the above described embodiments of the present invention, the security information (a device identifier, an address information, a password, etc.) to be recorded in the security area may be encoded to enhance the secrecy. In this case, specific information for encoding is added to the security setup command, and the security information that are encoded in accordance with the information for encoding is recorded in the security area.

Figure 15:
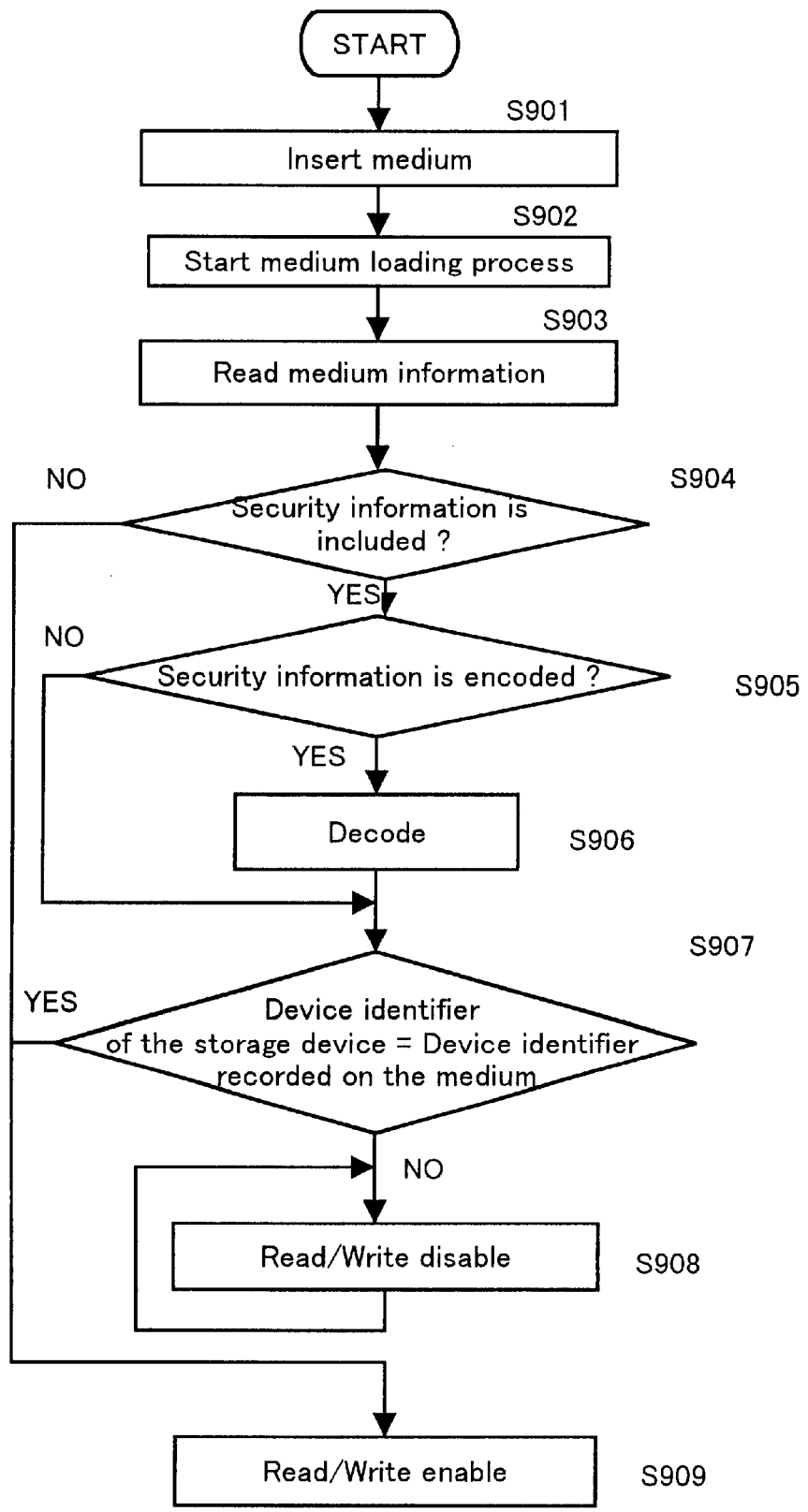
FIG. 15 is a flowchart for the memory medium loading process performed when security information is encoded.

FIG. 15 is a flowchart for the medium loading process performed when the security information is encoded. In FIG. 15, when the medium is inserted into a storage device at step S901, at step S902, the loading of the medium is initiated. At step S903, medium management information is read, and at step S904, a check is performed to determine whether there is security information included in the medium information.

When, at step S904, it is determined that no security information is included, the process advances to step S909, whereat the reading and the writing of data the medium are enabled.

If, at step S904, it is determined that the security information is included, at step S905 a check is performed to determine whether the security information is encoded. When the security information is encoded, at step S906, the security information is decoded.

At step S907, the device identifier included in the security information is compared with the device identifier of the storage device into which the medium has currently been loaded to determine whether the two device identifiers match. When the device identifiers match, security is released and the process advances to step S909, whereat the reading and the writing of data to the medium are enabled.

If, at step S907, the device identifiers do not match, the security is not released, and the reading data from and writing of data to the medium are inhibited (step S908).

Figure 16:
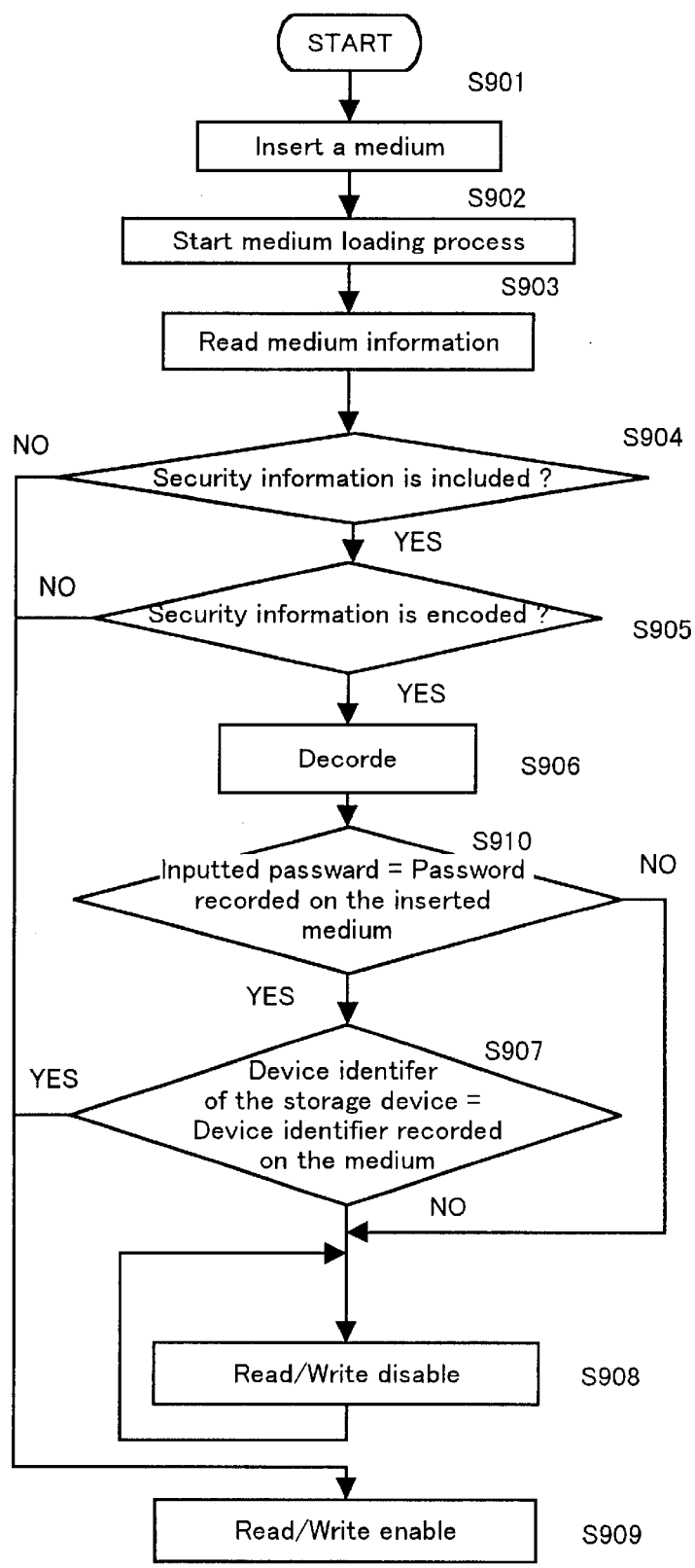
FIG. 16 is a flowchart for the memory medium loading process performed when security information is encoded and a password is set.

FIG. 16 is a flowchart for the medium loading process performed when the security information in FIG. 15 includes a password. In FIG. 16, step S910 is added to the flowchart in FIG. 15. Specifically, when the security information is decoded at step S906, a password which is input is compared with a password included in the security information. When the two passwords do not match, the security is not released, and the reading and the writing of data to the medium are inhibited (step S908).

When the passwords match, the process advances to step S907, whereat comparison of the device identifiers is performed as described above.

For this process, the performance of steps S907 and S910, i.e., the comparison of passwords and the comparison of device identifiers, may be inverted. The execution sequence for the password comparison step and the device identifier comparison step can be arbitrarily set by the user, the maker or the retailer of a storage device, and such a setup can also be arbitrarily changed.

The encoding of the security information is performed by using, for example, a DES algorithm or a simple bit rearrangement process. The security information may be converted, for example, into ASCII, JIS, EDICIBIC or ECU code before being recorded in the security area.

In the above described embodiments of the present invention, the reading or the writing of data is permitted when device identifiers match. However, when the device identifiers do not match, either the reading or the writing of data may be permitted.

Further, another preferred embodiments of the present invention will now be described.

In the another preferred embodiments of the present invention, an additional security area is provided in the medium information management area, and the security area has a medium identifier inherent to a medium, such as a serial number of the medium. And the medium identifier in the security area is recorded in the storage device.

When the medium in which the medium identifier is recorded is inserted into a storage device, data reading/writing control is provided in accordance with the relationship between the medium identifier recorded in the storage device and the medium identifier of the medium. For example, only when the two identifiers match, the reading/writing of data is permitted. In other words, since a storage device whose medium identifier differs from that of the inserted medium inhibits the reading/writing of data from/to the medium, the secrecy of data can be maintained.

The writing in the storage device of the medium identifier is performed by the magneto-optical disk controller (ODC) 11 of a storage device in accordance with a security setup command received from a superior apparatus.

Figure 17:
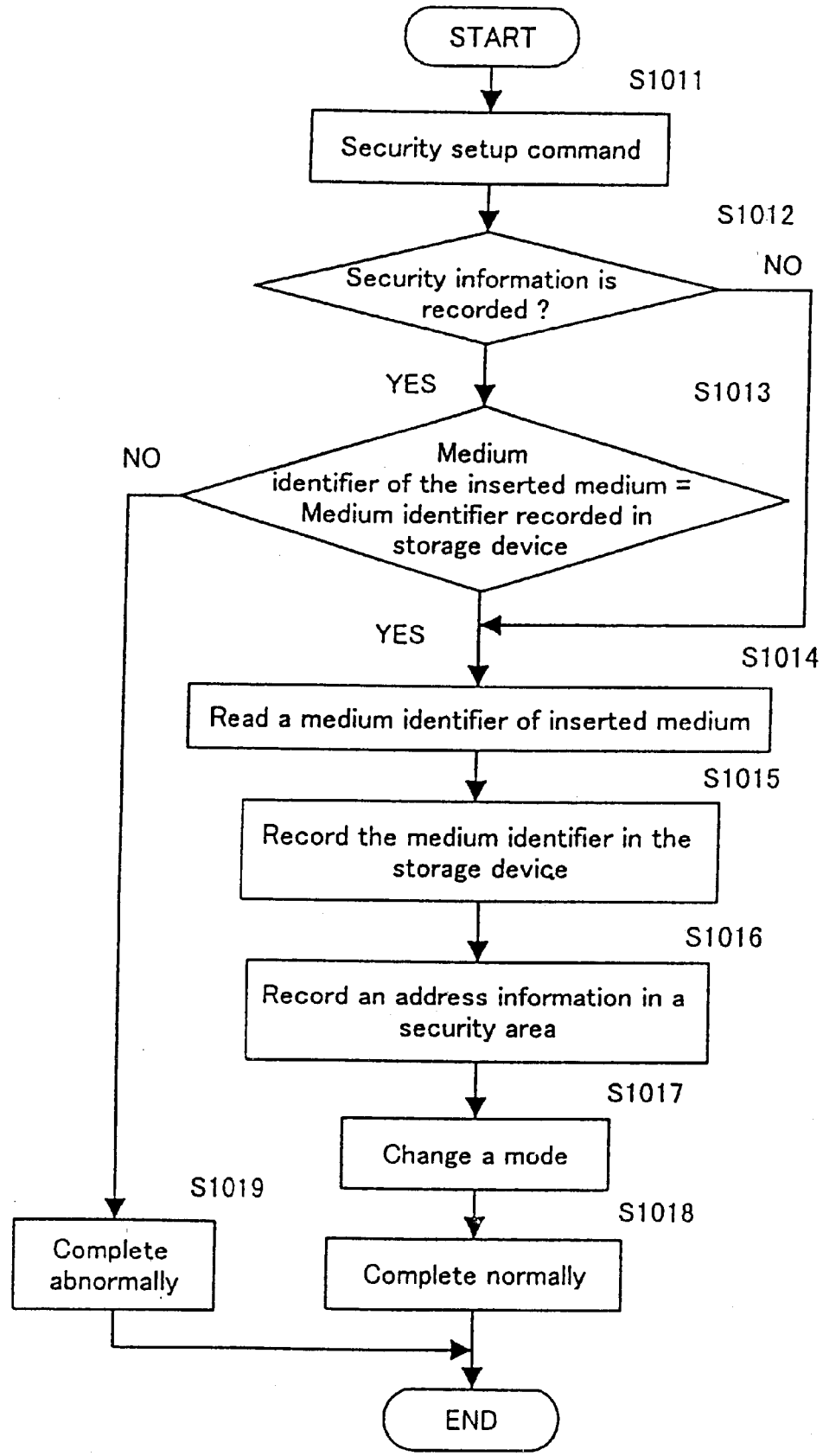
FIG. 17 is a flowchart for recording process of the medium identifier to the storage device.

FIG. 17 is a flowchart for recording process of the medium identifier to the storage device. In FIG. 17, when the storage device receives a security setup command at step S1011, a check is performed to determine whether the medium identifier is already recorded in the storage device at step S1012. Then, if already recorded, recorded medium identifier is compared with the medium identifier of the inserted medium at step 1013. In case that the two identifiers do not match, the process is completed abnormally (step S1019).

If not recorded yet at step S1012, the medium identifier of the inserted medium is read by ODC 11 (step S1014), and the read medium identifier is recorded in a memory area in the ODC 11 (step S1015). As described after, in case that security is set to a part of the data stored in the medium, an address information of the part of the data is recorded in the security area of the medium at step S1016. A mode of the storage device is changed to a mode designated by security setup command at step S1017 and the process is completed normally (step S1018).

Figure 18:
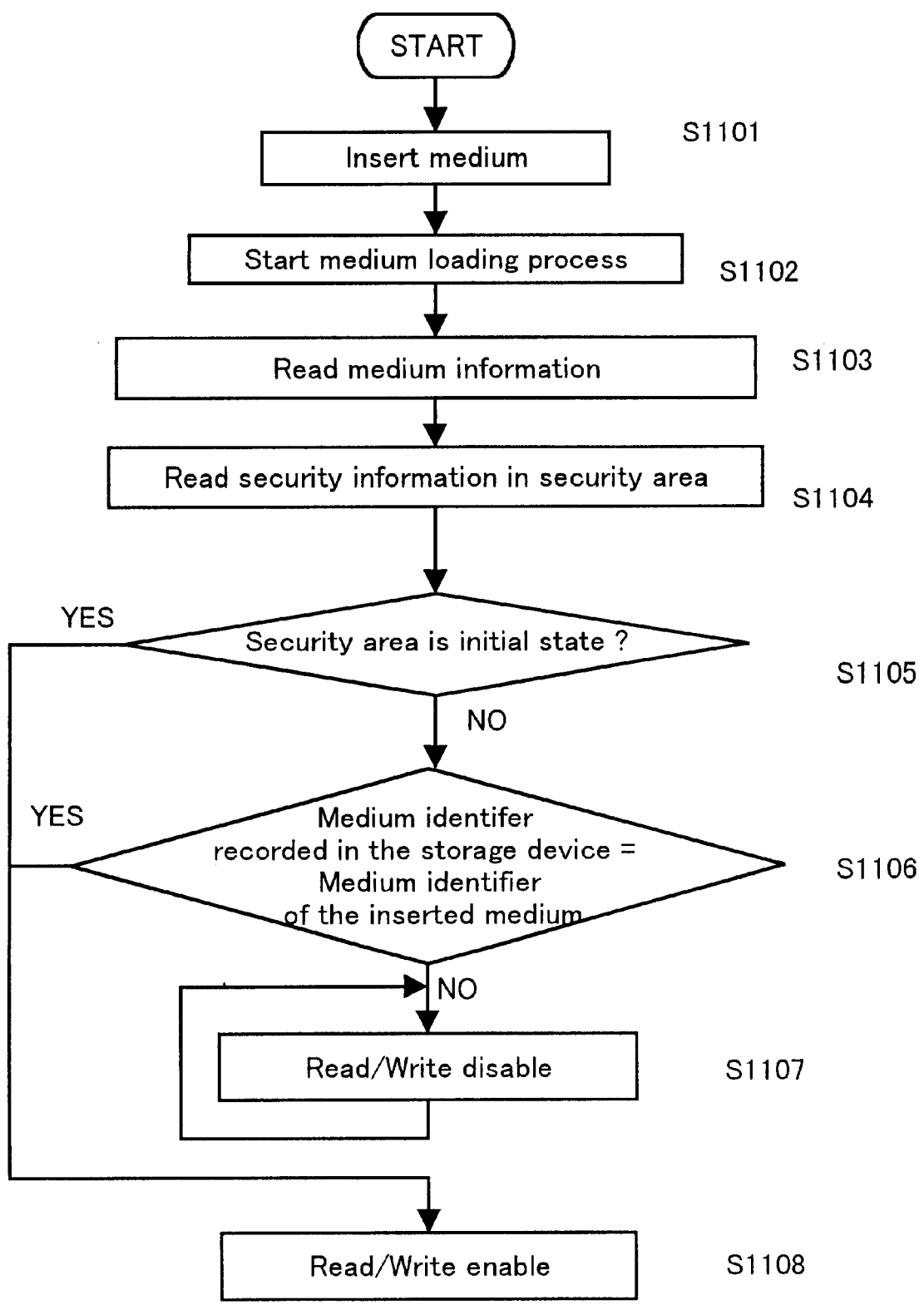
FIG. 18 is a flowchart for security process performed according to an eighth embodiment of the present invention.

FIG. 18 is a flowchart for the security process performed by the storage device 1, according to an eighth embodiment of the present invention. The security process, which will be explained below, is performed by the magneto-optical disk controller (ODC) 11 of the storage device 1.

In FIG. 18, Since steps S1101 to S1105 correspond to steps S101 to S105 in FIG. 5, no explanation for them will be given.

At step S1105, a check is performed to determine whether the security area is in the initial state. If, at step S1105, the medium identifier has been recorded in the security area, i.e., if the security level has been set, at step S1106, the medium identifier recorded in the storage device is compared with the medium identifier of the inserted medium in order to determine whether the two medium identifiers match.

When the two medium identifiers match, the process then advances to step S1108 and the security is released i.e. the reading/writing of the data from/to the medium is permitted (step S1108).

When at step S1106, the two medium identifiers do not match, the security is not released and the reading/writing of data is inhibited (step S1107).

As described above, in this embodiment, the security area in which the medium identifier of the medium provided in the security area is recorded in the storage device. When the medium is loaded into the storage device and when the medium identifier of the inserted medium does not match the medium identifier recorded in the storage device, the reading and writing of data is inhibited. Thus, even though the medium has been stolen, the secrecy of the data recorded in the medium can be maintained.

Figure 19:
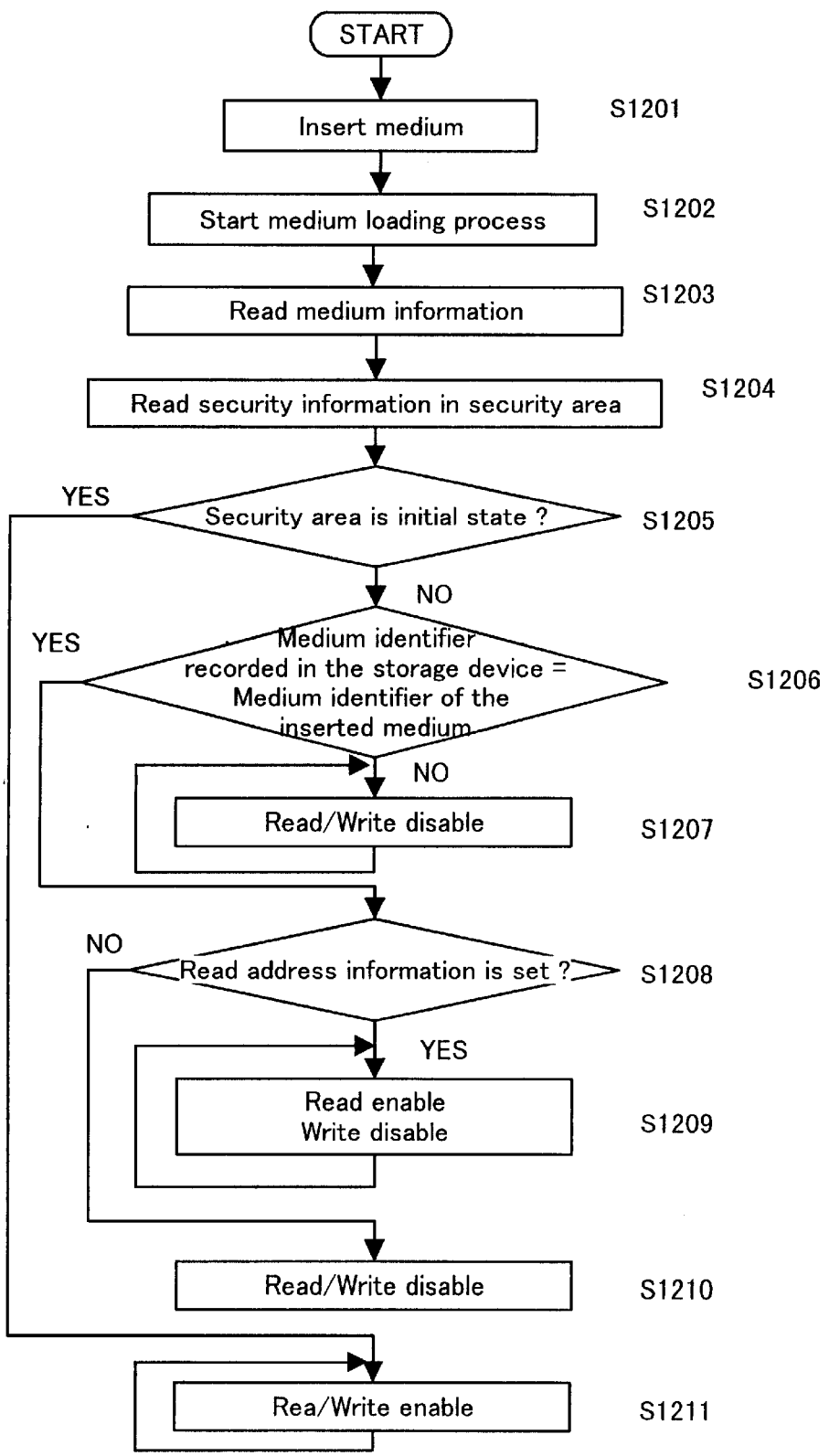
FIG. 19 is a flowchart for the security process performed according to a ninth embodiment of the present invention.

FIG. 19 is a flowchart for the security process performed according to a ninth embodiment of the present invention. In the ninth embodiment, the read address information is recorded in the above described parameter head. Since steps S1201 to S1205 in FIG. 19 correspond to steps S201 to S205 in FIG. 8, no explanation for them will be given.

If, at step S1205, the security information has been set, at step S1206, the medium identifier read from the storage device is compared with the medium identifier of the inserted medium to determine whether the two medium identifiers match. When the medium identifiers do not match, the process advances to step S1207 and when the two medium identifiers match, the process advances to step S1208.

Since steps S1207 to S1211 in FIG. 19 correspond to steps S207 to S211 in FIG. 8, no explanation for them will be given.

Figure 20:
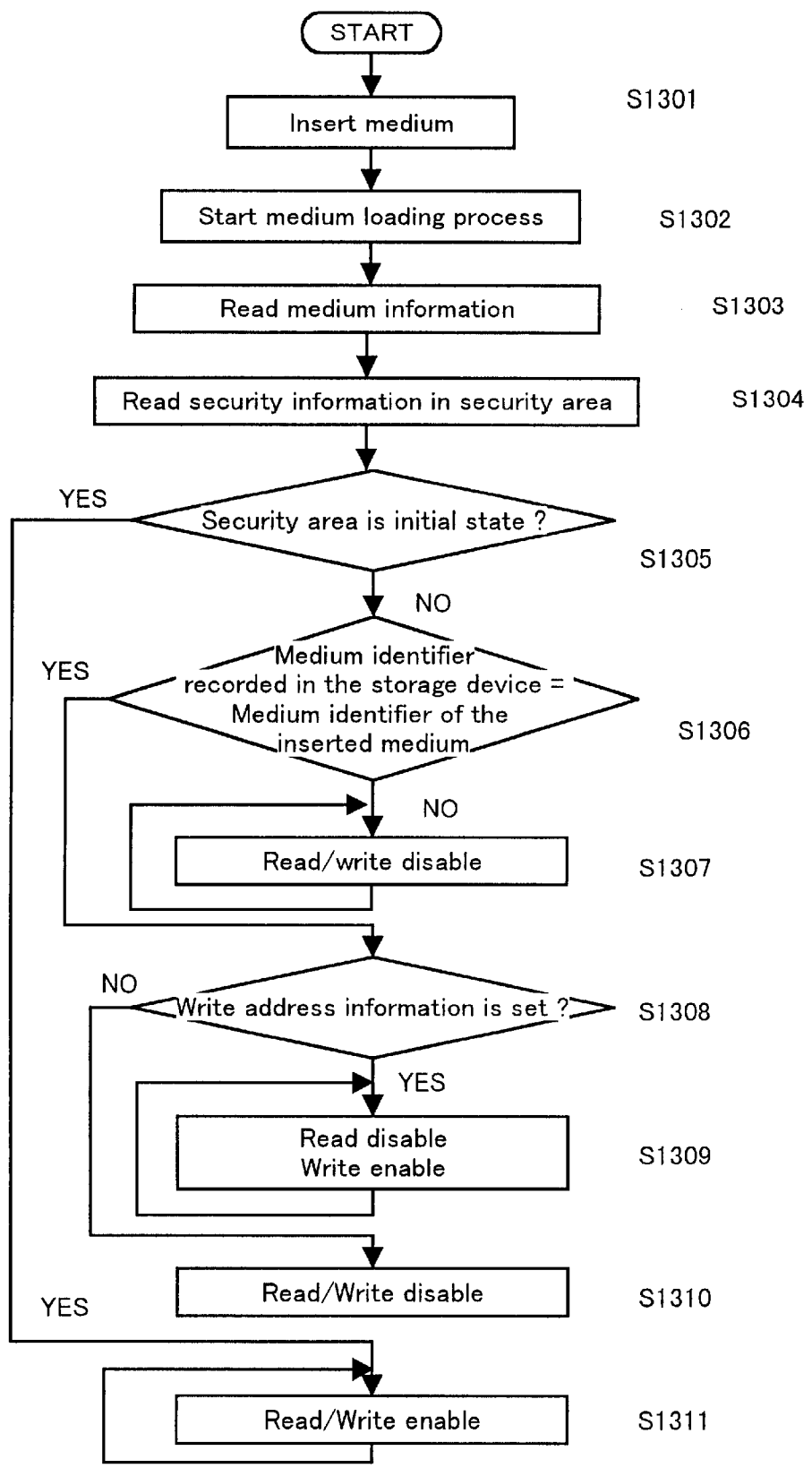
FIG. 20 is a flowchart for the security process performed according to a tenth embodiment of the present invention.

FIG. 20 is a flowchart showing the security process performed according to a tenth embodiment of the present invention. In this embodiment, the write address information is set in the parameter header. Since steps S1301 to S1305 in FIG. 20 correspond to steps S301 to S305 in FIG. 9, no explanation for them will be given.

If, at step S1305, the security information has been set, at step S1306, the medium identifier read from the storage device is compared with the medium identifier of the inserted medium to determine whether the two medium identifiers match. When the medium identifiers do not match, the process advances to stop S1307 and when the two medium identifiers match, the process advances to step S1308.

Since steps S1307 to S1311 in FIG. 20 correspond to steps S307 to S311 in FIG. 9, no explanation for them will be given.

Figure 21:
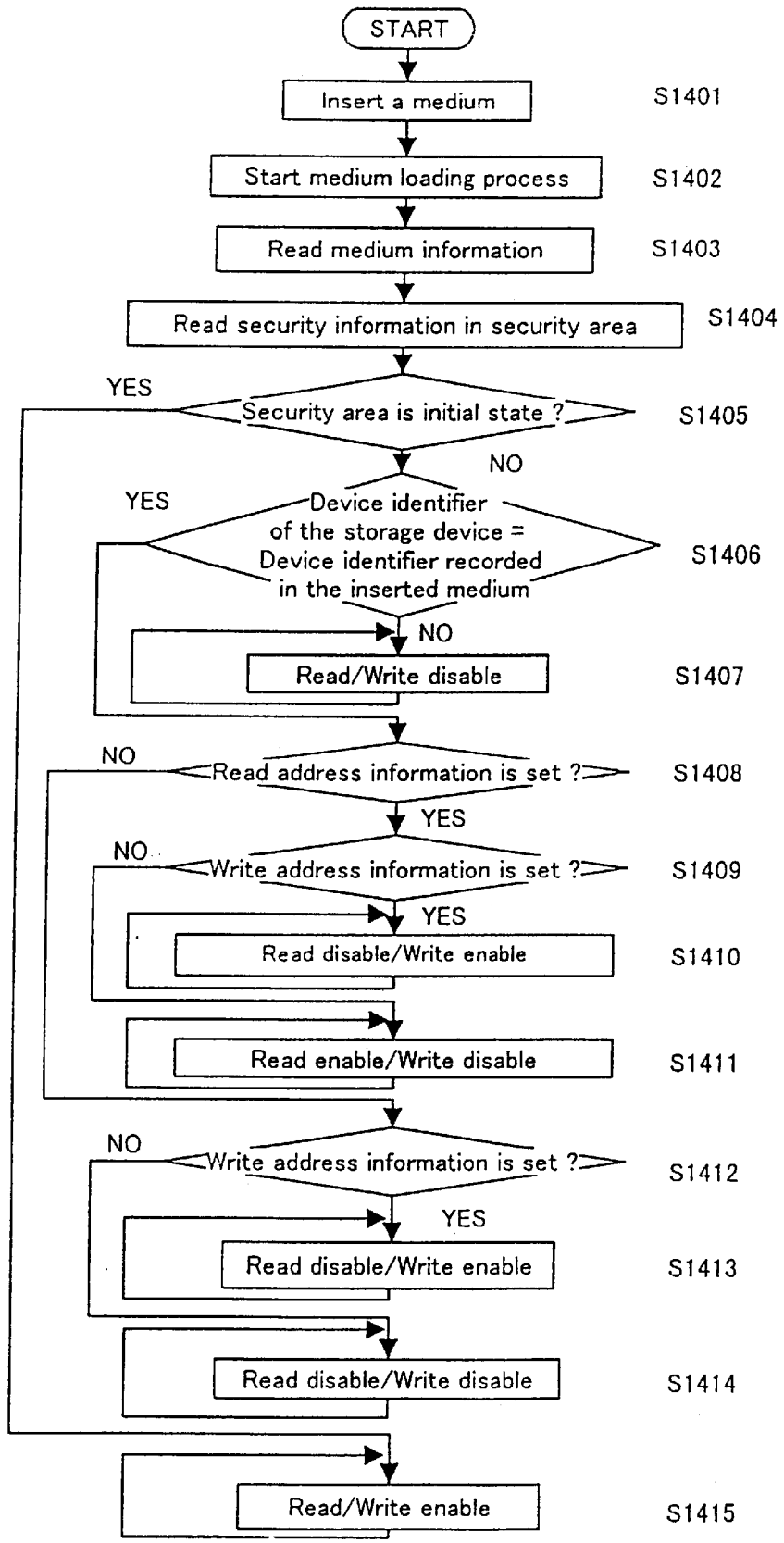
FIG. 21 is a flowchart for the security process performed according to an eleventh embodiment of the present invention.

FIG. 21 is a flowchart showing the security process performed according to an eleventh embodiment of the present invention. In this embodiment, both the read address information and the write address information are set in the parameter header. Since steps S1401 to S1405 in FIG. 21 correspond to steps S401 to S405 in FIG. 10, no explanation for them will be given.

If, at step S1405, the security information has been set, at step S1406, the medium identifier read from the storage device is compared with the medium identifier of the inserted medium to determine whether the two medium identifiers match. When the medium identifiers do not match, the process advances to step S1407, and when the two medium identifiers match, the process advances to step S1408.

Since steps S1407 to S1415 in FIG. 21 correspond to steps S407 to S415 in FIG. 10, no explanation for them will be given.

Figure 22:
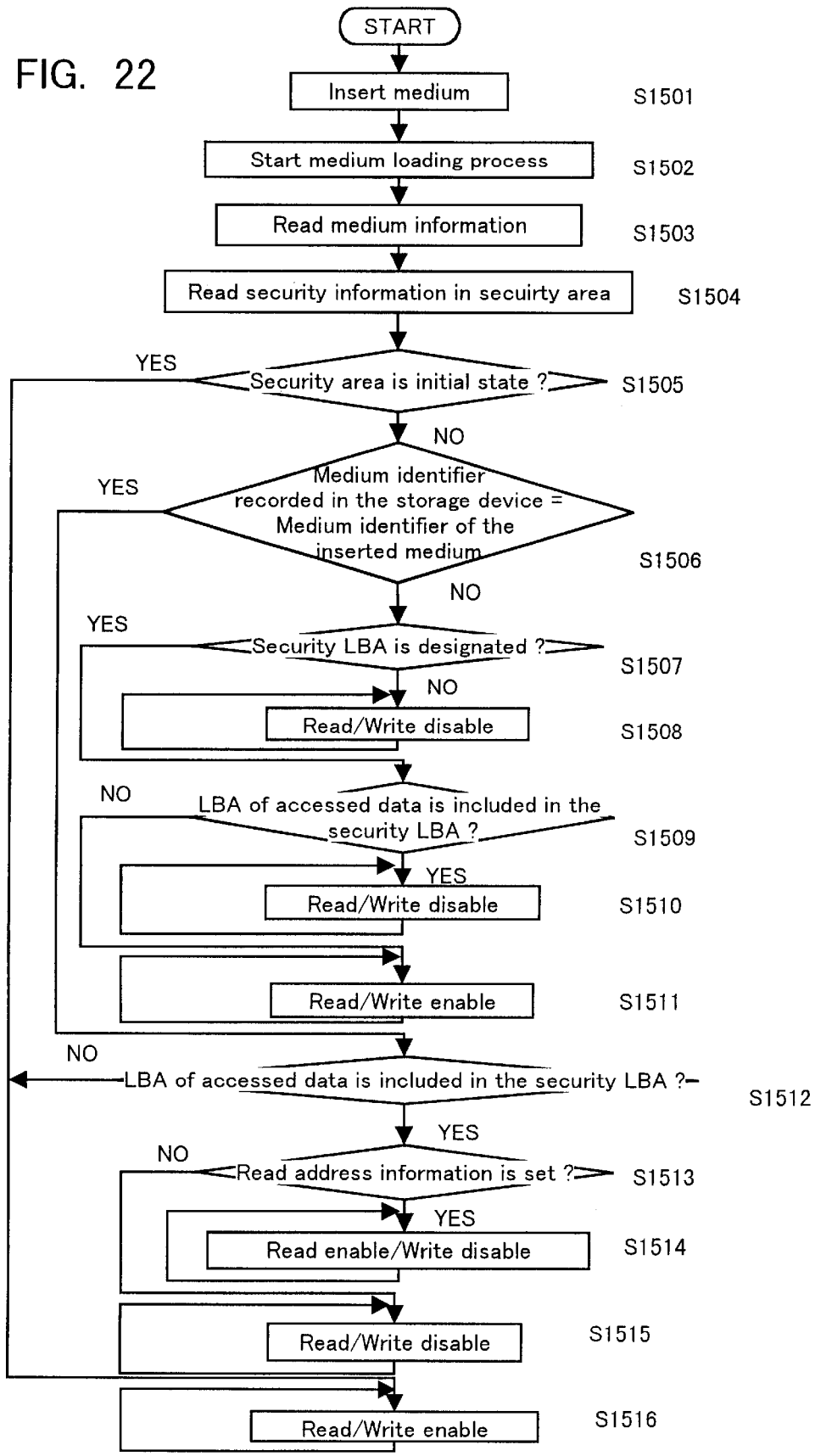
FIG. 22 is a flowchart for the security process performed according to a twelfth embodiment of the present invention.

FIG. 22 is a flowchart for the security process performed according to twelfth embodiment of the present invention. In this embodiment, as well as in the fifth embodiment, the security LBA is set when read address information is set. Since steps S1501 to S1505 in FIG. 22 correspond to steps S1501 to S1505 in FIG. 12, no explanation for them will be given.

If, at step S1505, the security information has been set, at step S1506, the medium identifier read from the storage device is compared with the medium identifier of the inserted medium to determine whether the two medium identifiers match. When the medium identifiers do not match, the process advances to step S1507 and when the two medium identifiers match, the process advances to step S1512.

Since steps S1507 to S1516 in FIG. 22 correspond to steps S507 to S516 in FIG. 11, no explanation for them will be given.

Figure 23:
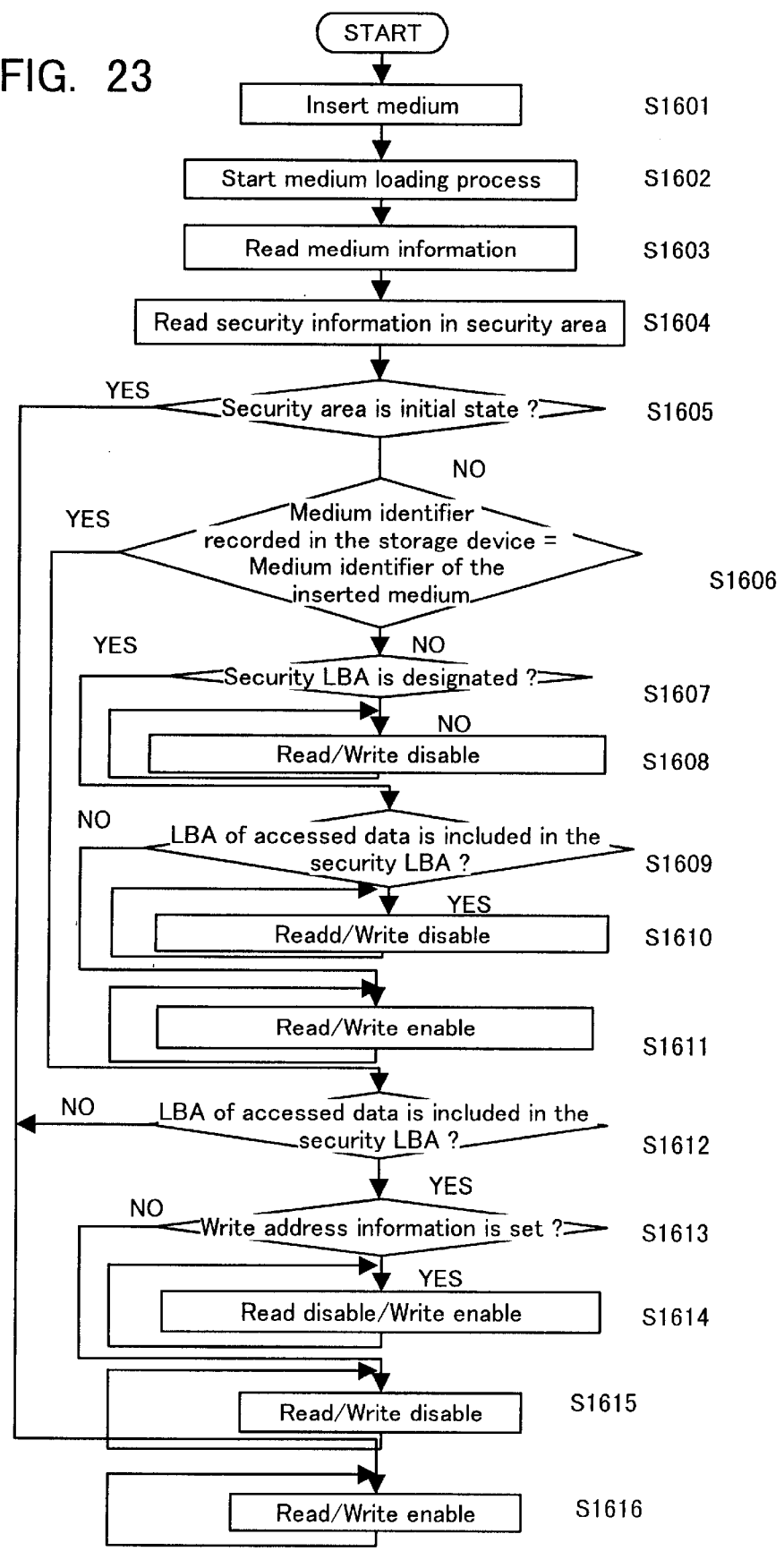
FIG. 23 is a flowchart for the security process performed according to a thirteenth embodiment of the present invention.

FIG. 23 is a flowchart for the security process performed according to a thirteenth embodiment of the present invention. In this embodiment, as well as in the sixth embodiment, the security LBA is set when the write address information is set. Since steps S1601 to S1605 in FIG. 23 correspond to steps S601 to S605 in FIG. 12, no explanation for them will be given.

If, at step S1605, the security information has been set, at step S1606, the medium identifier read from the storage device is compared with the medium identifier of the inserted medium to determine whether the two medium identifiers match. When the medium identifiers do not match, the process advances to step S1607, and when the two medium identifiers match, the process advances to step S1612.

Since steps S1607 to S1616 in FIG. 23 correspond to steps S607 to S616 in FIG. 12, no explanation for them will be given.

Figure 24:
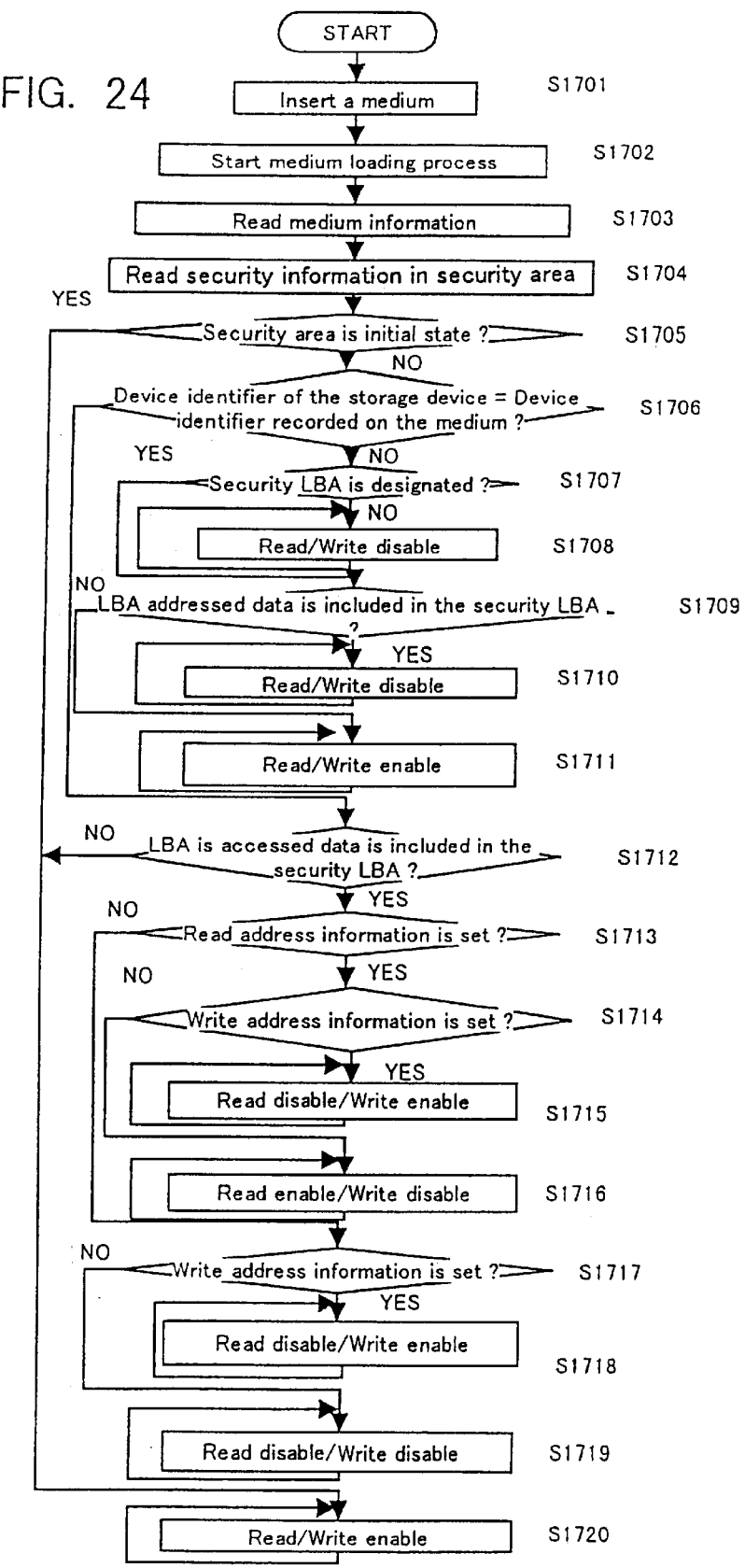
FIG. 24 is a flowchart for the security process performed according to a fourteenth embodiment of the present invention.

FIG. 24 is a flowchart for the security process performed according to a fourteenth embodiment of the present invention. In this embodiment, as well as in the seventh embodiment, the security LBA is set when the read address information and the write address information are set. Since steps S1701 to S1705 in FIG. 24 correspond to steps S701 to S705 in FIG. 13, no explanation for them will be given.

If, at step S1705, the security information has been set, at step S1706, the medium identifier read from the storage device is compared with the medium identifier of the inserted medium in order to determine whether the two medium identifiers match. When the medium identifiers do not match, the process advances to step S707 and when the two medium identifiers match, the process advances to step S712.

Since steps S1707 to S1720 in FIG. 24 correspond to steps S707 to S720 in FIG. 13, no explanation for them will be given.

Figure 25:
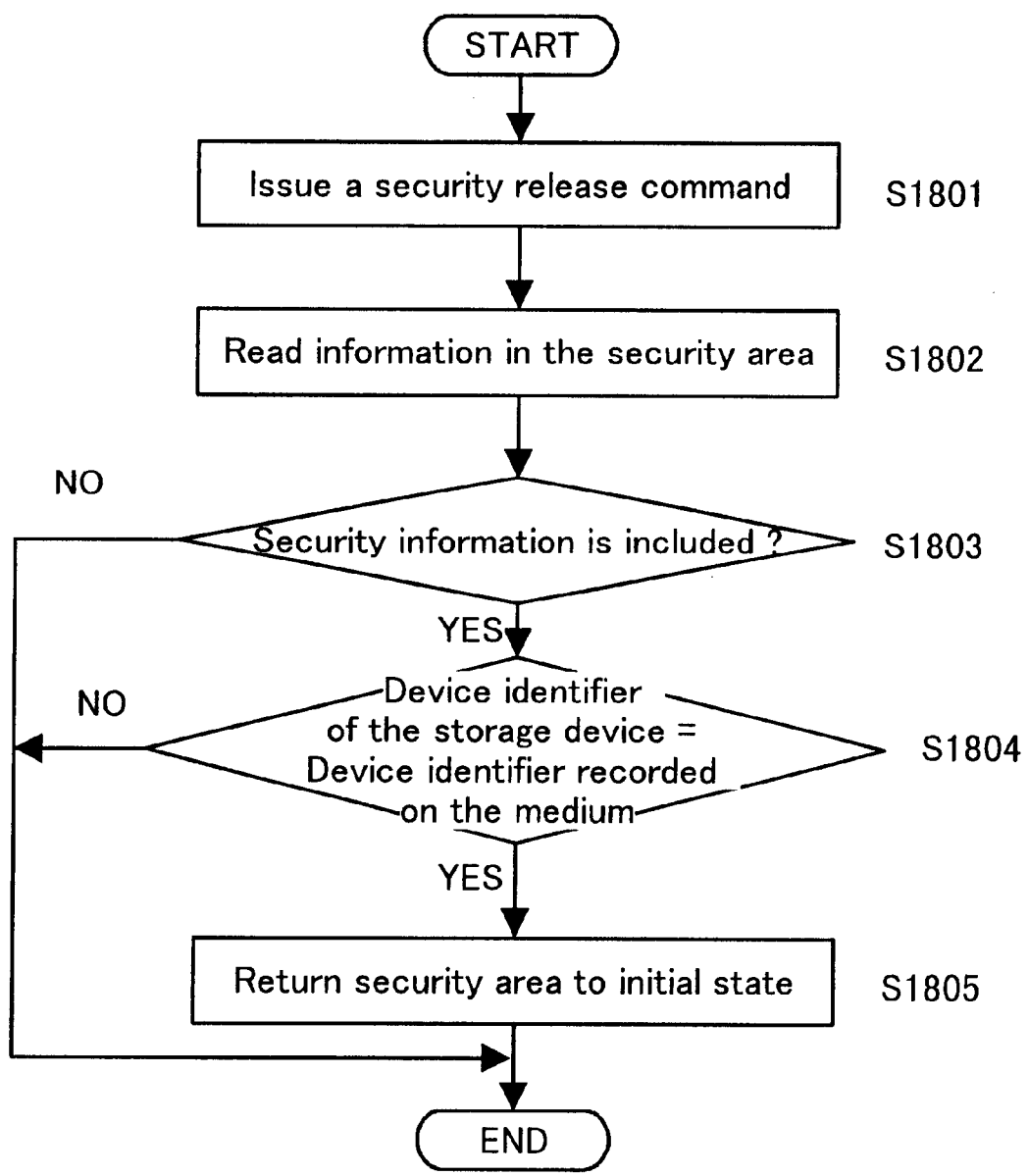
FIG. 25 is a flowchart for the security release process in the another embodiments.

FIG. 25 is a flowchart for the security release process performed to release the security setup state in the another preferred embodiments.

Since steps S1801 to S1803 in FIG. 25 correspond to steps S801 to S803 in FIG. 14, no explanation for them will be given.

When security information has been recorded in the security area at step S1803, the process advances to step S1804, whereat the medium identifier recorded in the storage device is compared with the medium identifier of the inserted medium. When the two medium identifiers match, a predetermined initial value is recorded in the security area to return the area to the initial state (to initialize the area) (step S1805).

When the medium identifiers do not match, or when no security information is recorded in the security area, the security release process is not performed.

In the above described another embodiments of the present invention, the security information (a medium identifier, an address information, a password, etc.) to be recorded in the security area may be encoded to enhance the secrecy. In this case, information for encoding are added to the security setup command, and the security information that is encoded in accordance with the information for encoding are recorded in the security area.

Figure 26:
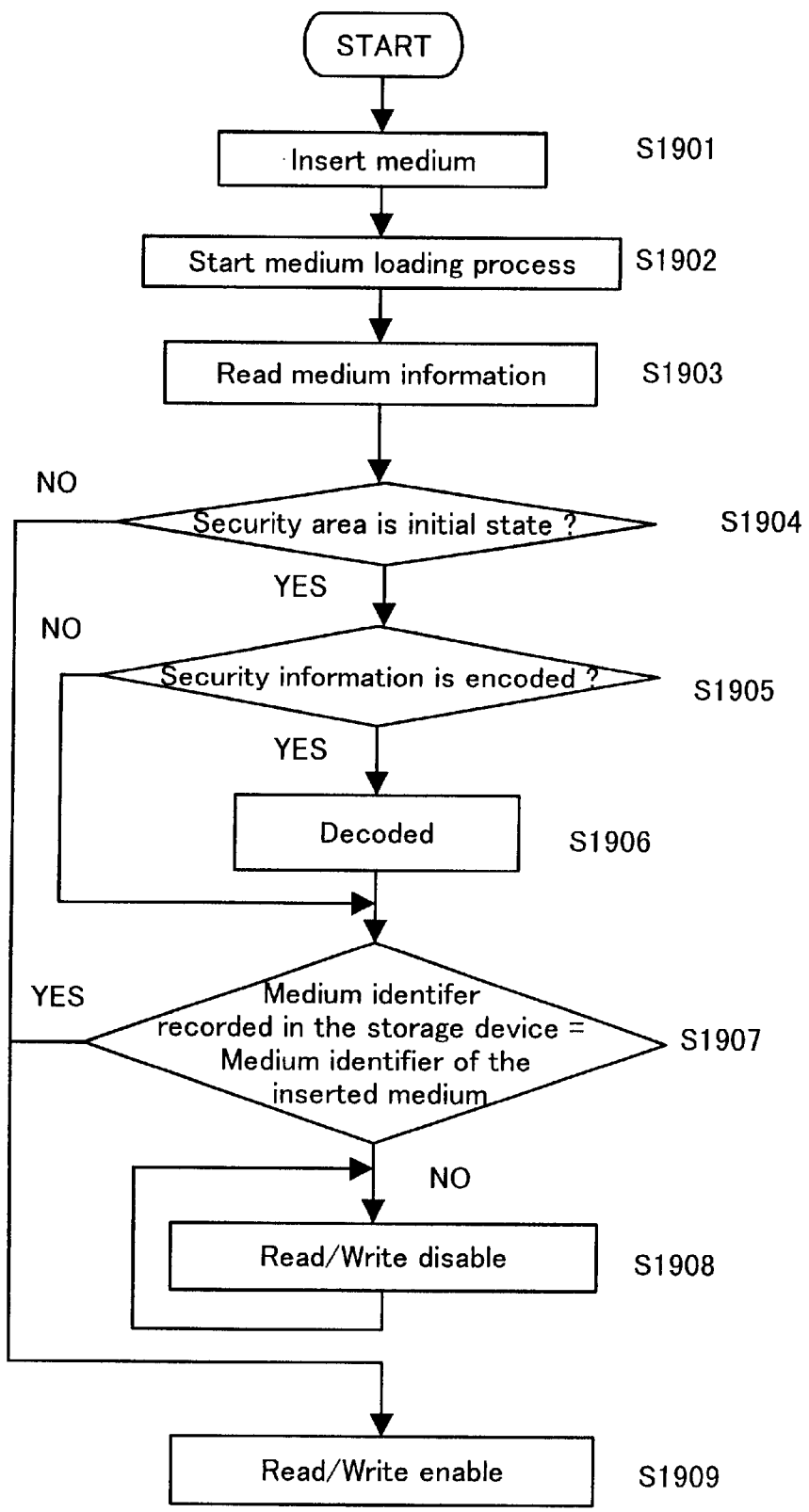
FIG. 26 is a flowchart for the memory medium loading process performed when security information is encoded in the another embodiment.

FIG. 26 is a flowchart for the medium loading process performed when security information is encoded. In FIG. 26, Since steps S1901 to S1806 in FIG. 26 correspond to steps S901 to S906 in FIG. 15, no explanation for them will be given.

At step S1907, the medium identifier recorded in the storage device is compared with the medium identifier of the inserted medium to determine whether the two medium identifiers match. When the medium identifiers match, security is released and the process advances to step S1909, whereat the reading and the writing of data to the medium are enabled.

If, at step S1907, the medium identifiers do not match, security is not released, and the reading data from and writing of data to the medium are inhibited (step S1908).

FIG. 27 is a flowchart for the medium loading process performed when the security information includes a password in FIG. 26. In FIG. 27, step S1910 is added to the flowchart in FIG. 26. Specifically, when the security information is decoded at step S1906, a password which is input is compared with a password included in the security information. When the two passwords do not match, the security is not released, and the reading and the writing of data to the medium are inhibited (step S1908). When the passwords match, the process advances to step S1907, whereat comparison of the medium identifiers is performed as described above.

As is described above, according to the present invention, a security area is provided for a medium information management area on a medium, such as a magneto-optical disk, and a device identifier inherent to a storage device is recorded in the security area. When such a medium is inserted into a storage device, the device identifier recorded in the medium is compared with the device identifier of the storage device, and when the device identifiers do not match, accessing the data on the medium is inhibited. As a result, the data secrecy is ensured.

Further a medium identifier inherent to a medium is recorded in the storage device. When such a medium is inserted into a storage device, the medium identifier recorded in the storage device is compared with the medium identifier of the inserted medium, and when the medium identifiers do not match, accessing the data on the medium is inhibited. As a result, the data secrecy is ensured.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. A data storage device which reads data from and/or writes data to a memory medium, comprising:

a storage unit for storing a first identifier, said first identifier identifying said data storage device as a unique device;

an identifier acquisition unit for acquiring a second identifier previously recorded by said storage device itself in a first area of said memory medium, said memory medium being set to said data storage device; and a controller for comparing said first identifier with said second identifier, and permitting or inhibiting access to a second area of said memory medium for data reading and/or writing in accordance with a result obtained by the comparison of said first identifier and said second identifier, wherein said data storage device reads out said first identifier from said storage unit and records said first identifier to said first area of said memory medium as said second identifier when a security state of said memory medium is in an initial state.

2. The data storage device according to claim 1, wherein said first and second identifiers are serial numbers of said data storage device.

3. The data storage device according to claim 1, wherein said memory medium includes read address information to be used to control data reading, and said controller permits or inhibits the reading of data in accordance with said read address information and a result obtained by the comparison of said first identifier and said second identifier.

4. The data storage device according to claim 1, wherein said memory medium includes write address information to be used to control data writing, and said controller permits or inhibits the writing of data in accordance with said write address information and a result obtained by the comparison of said first identifier and said second identifier.

5. A data storage device which reads data from and/or writes data to a memory medium by designating first address information, comprising:
   a storage unit for storing a first identifier, said first identifier identifying said data storage device as a unique device;
   an identifier acquisition unit for acquiring a second identifier previously recorded by the data storage device in a first area of said memory medium, said memory medium being set to said data storage device;
   an address information acquisition unit for acquiring second address information recorded in said memory medium; and
   a controller for comparing said first identifier with said second identifier and said first address information with said second address information, and permitting or inhibiting access to a second area of said memory medium for data reading and/or writing in accordance with a result obtained by a comparison of said first identifier and said second identifier and a comparison of said first address information and said second address information,
   wherein said data storage device reads out said first identifier from said storage unit and records said first identifier to said first area of said memory medium as said second identifier when a security state of said memory medium is in an initial state.

6. The data storage device according to claim 5, wherein said memory medium includes read address information to be used to control data reading, and said controller permits or inhibits the reading of data in accordance with said read address information, a result obtained by the comparison of said first identifier and said second identifier and a result obtained by the comparison of said first address information and said second address information.

7. The data storage device according to claim 5, wherein said memory medium includes write address information to be used to control data writing, and said controller permits or inhibits the writing of data in accordance with said write address information, a result obtained by the comparison of said first identifier and said second identifier and a result obtained by the comparison of said first address information and said second address information.

8. The data storage device according to claim 1, wherein said memory medium includes a password, and said controller permits or inhibits the reading of data and/or the writing of data in accordance with determination of said password and a result obtained by the comparison of said first identifier and said second identifier.

9. The data storage device according to claim 1, wherein said memory medium is one of writable memory media as a magnetic disk, a floppy disk, an optical disk, a magneto-optical disk and a phase change optical disk.

10. A method for controlling a data storage device which reads data from and/or writes data to a memory medium by designating first address information, comprising the steps of:
   acquiring a first identifier stored in said data storage device, said first identifier identifying the data storage device as a unique device;
   acquiring a second identifier previously recorded by said data storage device in a first area of said memory medium, said memory medium being set to said data storage device;
   comparing said first identifier with said second identifier; and
   permitting or inhibiting access to a second area of said memory medium for reading of data and/or writing of data in accordance with a result obtained by said comparing step,
   wherein said data storage device reads out said first identifier from said storage unit and records said first identifier to said first area of said memory medium as said second identifier when a security state of said memory medium is in an initial state.

11. The control method according to claim 10, wherein said memory medium includes read address information to be used to control data reading, and in said step of controlling, and the reading of data is permitted or inhibited in accordance with said read address information and a result obtained by the comparison of said first identifier and said second identifier.

12. The control method according to claim 10, wherein said memory medium includes write address information to be used to control data writing, and in said step of controlling, and the writing of data is permitted or inhibited in accordance with said write address information and a result obtained by the comparison of said first identifier and said second identifier.

13. The control method according to claim 10, wherein said memory medium includes a password, and in said step of controlling, the reading of data and/or the writing of data is permitted or inhibited in accordance with determination of said password and a result obtained by the comparison of said first identifier and said second identifier.

14. The control method according to claim 10, further comprising the step of recording said second identifier in said predetermined area on said memory medium based on a designated setup command.

15. The control method according to claim 14, further comprising the step of encoding the second identifier to be recorded in said predetermined area on said memory medium.

16. The control method according to claim 14, wherein said setup command is an initializing command for initializing said memory medium or a specific command provided to record.

17. The control method according to claim 14, wherein said predetermined area is initialized to release the setup for said predetermined area.

18. The control method according to claim 14, wherein said predetermined area on said memory medium is a medium information management area established apart from a data area on said memory medium.

19. The control method according to claim 10, wherein said memory medium is one of writable memory media as a magnetic disk, a floppy disk, an optical disk, a magneto-optical disk and a phase change optical disk.

* * * * *